(12) United States Patent
Nishita

(10) Patent No.: US 10,389,119 B2
(45) Date of Patent: Aug. 20, 2019

(54) ELECTRICITY WHEELING CONTROL APPARATUS, ELECTRICITY WHEELING CONTROL METHOD, AND ELECTRICITY WHEELING CONTROL SYSTEM

(71) Applicant: Mitsubishi Electric Corporation, Chiyoda-ku (JP)

(72) Inventor: Yoshito Nishita, Tokyo (JP)

(73) Assignee: Mitsubishi Electric Corporation, Chiyoda (JP)

( * ) Notice: Subject to any disclaimer, the term of this patent is extended or adjusted under 35 U.S.C. 154(b) by 0 days.

(21) Appl. No.: 16/083,679

(22) PCT Filed: Apr. 18, 2017

(86) PCT No.: PCT/JP2017/015627
§ 371 (c)(1),
(2) Date: Sep. 10, 2018

(87) PCT Pub. No.: WO2017/191754
PCT Pub. Date: Nov. 9, 2017

(65) Prior Publication Data
US 2019/0079566 A1 Mar. 14, 2019

(30) Foreign Application Priority Data

May 2, 2016 (JP) .................................. 2016-092389

(51) Int. Cl.
*H02J 3/00* (2006.01)
*G06Q 50/06* (2012.01)
(Continued)

(52) U.S. Cl.
CPC ................ *H02J 3/00* (2013.01); *G06Q 50/06* (2013.01); *H02J 3/38* (2013.01); *H02J 7/0068* (2013.01); *Y04S 50/12* (2013.01)

(58) Field of Classification Search
CPC .. H02J 3/00; H02J 7/0068; H02J 3/38; G06Q 50/06; Y04S 50/12
See application file for complete search history.

(56) References Cited

U.S. PATENT DOCUMENTS

| | | | |
|---|---|---|---|
| 7,430,459 B1 * | 9/2008 | Papalia .................. | G06Q 10/06 700/286 |
| 2003/0009401 A1 * | 1/2003 | Ellis .................... | G06Q 30/0283 705/35 |

FOREIGN PATENT DOCUMENTS

| | | |
|---|---|---|
| JP | 2010-220428 A | 9/2010 |
| JP | 2013-78177 A | 4/2013 |

(Continued)

OTHER PUBLICATIONS

International Search Report dated Jul. 11, 2017 in PCT/JP2017/015627 filed Apr. 18, 2017.

*Primary Examiner* — Daniel J Cavallari
(74) *Attorney, Agent, or Firm* — Oblon, McClelland, Maier & Neustadt, L.L.P.

(57) ABSTRACT

An energy management system in an electricity customer possessing a distributed power supply includes a wheeling request generator that generates a wheeling request including a wheeling request amount, a wheeling necessity determiner that calculates a wheeling necessity value, a transmitter-receiver that sends the wheeling request amount and the wheeling necessity value to another energy management system, a wheeling negotiation partner determiner that determines at least one wheeling negotiation partner on the basis of wheeling necessity values received, a wheeling response determiner that calculates a wheeling capacity value for the at least one negotiation partner on the basis of the wheeling request amount received, and sends the wheeling capacity value via the transmitter-receiver, and a wheeling plan determiner that determines a wheeling plan on the (Continued)

basis of the wheeling capacity value received and on the basis of the wheeling request amount of that customer itself.

17 Claims, 23 Drawing Sheets

(51) Int. Cl.
  *H02J 3/38* (2006.01)
  *H02J 7/00* (2006.01)

(56) References Cited

FOREIGN PATENT DOCUMENTS

| | | |
|---|---|---|
| JP | 2013-258852 A | 12/2013 |
| WO | WO 2013/084268 A1 | 6/2013 |

\* cited by examiner

FIG.6

| CUSTOMER | DEMAND POWER AMOUNT (kWh) | SUPPLY POWER AMOUNT (kWh) |
|---|---|---|
| ELECTRICITY CUSTOMER 1-1 | 90 | 110 |
| ELECTRICITY CUSTOMER 1-2 | 120 | 110 |
| ELECTRICITY CUSTOMER 1-3 | 100 | 90 |

FIG.7

| CUSTOMER | EXCESS ELECTRICITY/POWER DEFICIENCY (kWh) |
|---|---|
| ELECTRICITY CUSTOMER 1-1 | 20 |
| ELECTRICITY CUSTOMER 1-2 | -10 |
| ELECTRICITY CUSTOMER 1-3 | -10 |

FIG.8

| CUSTOMER | LOSS COST |
|---|---|
| ELECTRICITY CUSTOMER 1-1 | 20 |
| ELECTRICITY CUSTOMER 1-2 | 10 |
| ELECTRICITY CUSTOMER 1-3 | 5 |

FIG.9

| CUSTOMER | WHEELING NECESSITY |
|---|---|
| ELECTRICITY CUSTOMER 1-1 | 400 |
| ELECTRICITY CUSTOMER 1-2 | 100 |
| ELECTRICITY CUSTOMER 1-3 | 50 |

FIG.10

|  |  | NEGOTIATION CALLER | | |
|---|---|---|---|---|
|  |  | ELECTRICITY CUSTOMER 1-1 | ELECTRICITY CUSTOMER 1-2 | ELECTRICITY CUSTOMER 1-3 |
| NEGOTI-ATION CALLEE | ELECTRICITY CUSTOMER 1-1 |  | -10kWh | -10kWh |
|  | ELECTRICITY CUSTOMER 1-2 | 10kWh |  | - |
|  | ELECTRICITY CUSTOMER 1-3 | 10kWh | - |  |

FIG.11

|  |  | NEGOTIATION CALLER | | |
|---|---|---|---|---|
|  |  | ELECTRICITY CUSTOMER 1-1 | ELECTRICITY CUSTOMER 1-2 | ELECTRICITY CUSTOMER 1-3 |
| NEGOTI-ATION CALLEE | ELECTRICITY CUSTOMER 1-1 |  | -10kWh | -10kWh |
|  | ELECTRICITY CUSTOMER 1-2 | 10kWh |  | 0kWh |
|  | ELECTRICITY CUSTOMER 1-3 | 10kWh | 0kWh |  |

|  |  | NEGOTIATION CALLER | | |
|---|---|---|---|---|
|  |  | ELECTRICITY CUSTOMER 1-1 | ELECTRICITY CUSTOMER 1-2 | ELECTRICITY CUSTOMER 1-3 |
| NEGOTI-ATION CALLER | ELECTRICITY CUSTOMER 1-1 |  | -10kWh | -10kWh |
| | ELECTRICITY CUSTOMER 1-2 | 10kWh |  | 0kWh |
| | ELECTRICITY CUSTOMER 1-3 | 10kWh | 0kWh |  |

FIG.15

| CUSTOMER | DEMAND POWER AMOUNT (kWh) |
|---|---|
| ELECTRICITY CUSTOMER 1-1 | 90 |
| ELECTRICITY CUSTOMER 1-2 | 120 |
| ELECTRICITY CUSTOMER 1-3 | 100 |

FIG.16

| CUSTOMER | | PLANNED VALUE (kWh) | MINIMUM POWER (kWh) | MAXIMUM POWER (kWh) |
|---|---|---|---|---|
| ELECTRICITY CUSTOMER 1-1 | PURCHASED ELECTRICITY | 70 | 0 | 100 |
| | STORAGE BATTERY | 20 | -20 | 20 |
| ELECTRICITY CUSTOMER 1-2 | PURCHASED ELECTRICITY | 100 | 0 | 100 |
| | SOLAR POWER GENERATION | 10 | - | - |
| ELECTRICITY CUSTOMER 1-3 | PURCHASED ELECTRICITY | 50 | 0 | 50 |
| | POWER GENERATOR | 50 | 0 | 50 |

FIG.17

| CUSTOMER | POWER MARGIN AND TIGHTNESS AMOUNT(kWh) |
|---|---|
| ELECTRICITY CUSTOMER 1-1 | 30 |
| ELECTRICITY CUSTOMER 1-2 | -10 |
| ELECTRICITY CUSTOMER 1-3 | -50 |

FIG.18

| CUSTOMER | WHEELING NECESSITY VALUE |
|---|---|
| ELECTRICITY CUSTOMER 1-1 | 30 |
| ELECTRICITY CUSTOMER 1-2 | 100 |
| ELECTRICITY CUSTOMER 1-3 | 50 |

FIG.19

|  |  | NEGOTIATION CALLER | | |
|---|---|---|---|---|
|  |  | ELECTRICITY CUSTOMER 1-1 | ELECTRICITY CUSTOMER 1-2 | ELECTRICITY CUSTOMER 1-3 |
| NEGOTI-ATION CALLER | ELECTRICITY CUSTOMER 1-1 |  | -10kWh | -20kWh |
|  | ELECTRICITY CUSTOMER 1-2 | 10kWh |  | 0kWh |
|  | ELECTRICITY CUSTOMER 1-3 | 30kWh | 0kWh |  |

FIG.20

|  |  | NEGOTIATION CALLER | | |
|---|---|---|---|---|
|  |  | ELECTRICITY CUSTOMER 1-1 | ELECTRICITY CUSTOMER 1-2 | ELECTRICITY CUSTOMER 1-3 |
| NEGOTI-ATION CALLER | ELECTRICITY CUSTOMER 1-1 |  | -10kWh | -20kWh |
|  | ELECTRICITY CUSTOMER 1-2 | 10kWh |  | 0kWh |
|  | ELECTRICITY CUSTOMER 1-3 | 20kWh | 0kWh |  |

FIG.21

| CUSTOMER | REQUEST AMOUNT (kWh) |
|---|---|
| ELECTRICITY CUSTOMER 1-1 | 0 |
| ELECTRICITY CUSTOMER 1-2 | 0 |
| ELECTRICITY CUSTOMER 1-3 | -30 |

FIG.22

| CUSTOMER | WHEELING NECESSITY VALUE |
|---|---|
| ELECTRICITY CUSTOMER 1-1 | 0 |
| ELECTRICITY CUSTOMER 1-2 | 0 |
| ELECTRICITY CUSTOMER 1-3 | 30 |

| | | NEGOTIATION CALLER | | |
|---|---|---|---|---|
| | | ELECTRICITY CUSTOMER 1-1 | ELECTRICITY CUSTOMER 1-2 | ELECTRICITY CUSTOMER 1-3 |
| NEGOTI-ATION CALLER | ELECTRICITY CUSTOMER 1-1 | | -10kWh | -20kWh |
| | ELECTRICITY CUSTOMER 1-2 | 10kWh | | 0kWh |
| | ELECTRICITY CUSTOMER 1-3 | 20kWh | 0kWh | |

FIG.26

| CUSTOMER | DEMAND POWER AMOUNT (kWh) |
|---|---|
| ELECTRICITY CUSTOMER 1-1 | 90 |
| ELECTRICITY CUSTOMER 1-2 | 120 |
| ELECTRICITY CUSTOMER 1-3 | 100 |

FIG.27

| CUSTOMER | | PLANNED VALUE (kWh) | MINIMUM POWER (kWh) | MAXIMUM POWER (kWh) | COST (YEN/kWh) |
|---|---|---|---|---|---|
| ELECTRICITY CUSTOMER 1-1 | PURCHASED ELECTRICITY | 70 | 0 | 100 | 10 |
| | STORAGE BATTERY | 20 | -20 | 20 | 5 |
| ELECTRICITY CUSTOMER 1-2 | PURCHASED ELECTRICITY | 100 | 0 | 100 | 10 |
| | SOLAR POWER GENERATION | 10 | - | - | 0 |
| ELECTRICITY CUSTOMER 1-3 | PURCHASED ELECTRICITY | 100 | 0 | 105 | 10 |
| | POWER GENERATOR | 0 | 0 | 50 | 15 |

FIG.28

| CUSTOMER | POWER MARGIN AND TIGHTNESS AMOUNT (kWh) |
|---|---|
| ELECTRICITY CUSTOMER 1-1 | 30 |
| ELECTRICITY CUSTOMER 1-2 | -10 |
| ELECTRICITY CUSTOMER 1-3 | 55 |

FIG.29

| CUSTOMER | WHEELING REQUEST AMOUNT | WHEELING COST |
|---|---|---|
| ELECTRICITY CUSTOMER 1-1 | −30 TO 0kWh | 10 YEN/kWh |
| ELECTRICITY CUSTOMER 1-2 | 0 TO 10kWh | 10 YEN/kWh |
| ELECTRICITY CUSTOMER 1-3 | −5 TO 0kWh | 10 YEN/kWh |
| | −55 TO −5kWh | 15 YEN/kWh |

FIG.30

| CUSTOMER | WHEELING NECESSITY VALUE |
|---|---|
| ELECTRICITY CUSTOMER 1-1 | 30 |
| ELECTRICITY CUSTOMER 1-2 | 100 |
| ELECTRICITY CUSTOMER 1-3 | 55 |

FIG.31

| | | NEGOTIATION CALLER | | |
|---|---|---|---|---|
| | | ELECTRICITY CUSTOMER 1-1 | ELECTRICITY CUSTOMER 1-2 | ELECTRICITY CUSTOMER 1-3 |
| NEGOTI-ATION CALLER | ELECTRICITY CUSTOMER 1-1 | | -10kWh | - |
| | ELECTRICITY CUSTOMER 1-2 | 5kWh | | 5kWh |
| | ELECTRICITY CUSTOMER 1-3 | - | -10kWh | |

FIG.32

|  |  | NEGOTIATION CALLER | | |
|---|---|---|---|---|
|  |  | ELECTRICITY CUSTOMER 1-1 | ELECTRICITY CUSTOMER 1-2 | ELECTRICITY CUSTOMER 1-3 |
| NEGOTI-ATION CALLER | ELECTRICITY CUSTOMER 1-1 |  | -5kWh | 0kWh |
|  | ELECTRICITY CUSTOMER 1-2 | 5kWh |  | 5kWh |
|  | ELECTRICITY CUSTOMER 1-3 | 0kWh | -5kWh |  |

FIG.33

| CUSTOMER | POWER MARGIN AND TIGHTNESS AMOUNT (kWh) |
|---|---|
| ELECTRICITY CUSTOMER 1-1 | 25 |
| ELECTRICITY CUSTOMER 1-2 | 0 |
| ELECTRICITY CUSTOMER 1-3 | 50 |

FIG.34

| CUSTOMER | WHEELING NECESSITY VALUE |
|---|---|
| ELECTRICITY CUSTOMER 1-1 | 25 |
| ELECTRICITY CUSTOMER 1-2 | 0 |
| ELECTRICITY CUSTOMER 1-3 | 50 |

FIG.35

| CUSTOMER | WHEELING REQUEST AMOUNT | WHEELING COST |
|---|---|---|
| ELECTRICITY CUSTOMER 1-1 | −25 TO 0kWh | 12 YEN/kWh |
| ELECTRICITY CUSTOMER 1-2 | 0kWh | - |
| ELECTRICITY CUSTOMER 1-3 | −50 TO 0kWh | 15 YEN/kWh |

| | | NEGOTIATION CALLER | | |
| --- | --- | --- | --- | --- |
| | | ELECTRICITY CUSTOMER 1-1 | ELECTRICITY CUSTOMER 1-2 | ELECTRICITY CUSTOMER 1-3 |
| NEGOTIA-TION CALLER | ELECTRICITY CUSTOMER 1-1 | | -5kWh | 0kWh |
| | ELECTRICITY CUSTOMER 1-2 | 5kWh | | 5kWh |
| | ELECTRICITY CUSTOMER 1-3 | 0kWh | -5kWh | |

ELECTRICITY WHEELING CONTROL APPARATUS, ELECTRICITY WHEELING CONTROL METHOD, AND ELECTRICITY WHEELING CONTROL SYSTEM

FIELD

The present invention relates to an electricity wheeling control apparatus, an electricity wheeling control method, and an electricity wheeling control system, each for controlling electricity wheeling between multiple electricity customers.

BACKGROUND

In recent years, an increasing number of distributed power supplies, such as a power generation apparatus using renewable energy (e.g., sunlight) and a storage battery, are used in electricity customers, and energy management systems for interactively controlling these components have been developed. There is a future need for a technology for not only controlling a distributed power supply under the control of an electricity customer using a single energy management system, but also enabling collaboration and cooperation between multiple energy management systems to perform electricity wheeling, including supply of excess electricity and compensation for electricity deficiency, depending on a varying amount of power supply or power consumption.

For example, Patent Literature 1 suggests an electricity wheeling apparatus that, upon an occurrence of electricity deficiency among multiple electricity customers, sends a wheeling request to other customers requesting an answer of the wheeling capacity value of that electricity customer, and calculates the amounts of wheeling electricity between electricity customers based on the requested amount of wheeling (hereinafter referred to as "wheeling request amount") of that customer and on the wheeling capacity values of the respective electricity customers.

CITATION LIST

Patent Literature

Patent Literature 1: Japanese Patent Application Laid-open No. 2013-258852

SUMMARY

Technical Problem

The electricity wheeling apparatus described in Patent Literature 1 enables an electricity customer that has received a wheeling request to calculate a wheeling capacity value based on that request. However, there may be more than one electricity customer sending a wheeling request, and in such situation, a problem arises in that an electricity customer that has received wheeling requests from multiple electricity customers is incapable of determining with which electricity customer to perform electricity wheeling. Moreover, the electricity wheeling apparatus described in Patent Literature 1 sends a wheeling request upon occurrence of electricity deficiency. However, increasingly widespread use of distributed power supplies among electricity customers may cause excess electricity in addition to electricity deficiency, thereby presenting a problem in that the electricity wheeling apparatus described in Patent Literature 1 is incapable of performing electricity wheeling in a case of excess electricity.

The present invention has been made in view of the foregoing, and it is an object of the present invention to provide an electricity wheeling control apparatus that provides electricity wheeling between multiple electricity customers even when multiple electricity customers are in need of electricity wheeling.

Solution to Problem

To solve the problem and achieve the object described above, the present invention is directed to an electricity wheeling control apparatus in an electricity customer possessing a distributed power supply and a load system, the electricity wheeling control apparatus including a wheeling request generator that generates a wheeling request including a wheeling request amount that represents an amount of wheeling electricity to be requested, on the basis of an operation plan for the distributed power supply and on the basis of a plan of purchase from a power system, a wheeling necessity determiner that calculates a wheeling necessity value on the basis of the wheeling request amount, and a transmitter-receiver that sends the wheeling request amount and the wheeling necessity value to an electricity wheeling control apparatus of another electricity customer. The electricity wheeling control apparatus also includes a negotiation partner determiner that determines at least one negotiation partner, who is an electricity customer to negotiate with about wheeling, on the basis of wheeling necessity values received from electricity wheeling control apparatuses of a group of other electricity customers, and a wheeling response determiner to calculate, for each of the at least one negotiation partner, a wheeling capacity value that represents an amount of electricity that can be allocated to the at least one negotiation partner, on the basis of wheeling request amounts received from the electricity wheeling control apparatuses of the group of other electricity customers and on the basis of the operation plan, and sends the wheeling capacity value to an electricity wheeling control apparatus of the at least one negotiation partner, via the transmitter-receiver. The electricity wheeling control apparatus further includes a wheeling plan determiner that determines a wheeling plan on the basis of wheeling capacity values received from the electricity wheeling control apparatuses of the group of other electricity customers and on the basis of the wheeling request amount calculated by the wheeling request generator.

Advantageous Effects of Invention

The present invention provides an advantage in providing electricity wheeling between multiple electricity customers even when multiple electricity customers are in need of electricity wheeling.

BRIEF DESCRIPTION OF DRAWINGS

FIG. 6 is a chart illustrating a set of plans of operation (hereinafter also referred to as "operation plans") at a certain time t arranged by the electricity customer, of the operation plans generated by operation plan generators of the energy management systems of the respective customers.

FIG. 7 is a chart illustrating the wheeling request amounts (i.e., amounts of excess electricity or electricity deficiency) at the time t, calculated in the energy management systems of the respective customers based on the operation plans illustrated in FIG. 6.

FIG. 8 is a chart illustrating an example of loss costs incurred by the respective electricity customers when a first method is used.

FIG. 9 is a chart illustrating an example of wheeling necessity values when the first method is used.

FIG. 10 is a chart illustrating wheeling capacity values calculated using the operation plans illustrated in FIG. 6 and the wheeling request amounts illustrated in FIG. 7.

FIG. 11 is a chart illustrating an example of fixed wheeling plans of the respective customers.

FIG. 15 is a chart illustrating an example of the amounts of demand power (hereinafter also referred to as "demand power amounts") of the respective customers at the time t in the operation plans.

FIG. 16 is a chart illustrating an example of power supply plans and device information of the respective customers at the time t.

FIG. 17 is a chart illustrating an example of wheeling request amounts, i.e., amounts of power margin (hereinafter also referred to as "power margin amounts") or amounts of power tightness (hereinafter also referred to as "power tightness amounts") of the respective electricity customers, calculated based on the demand power amounts illustrated in FIG. 15 and on the operation plans and the device information of the distributed power supplies illustrated in FIG. 16.

FIG. 18 is a chart illustrating wheeling necessity values when the wheeling necessity values are calculated using the wheeling request amounts illustrated in FIG. 17 and the loss costs illustrated in FIG. 8 related to the first embodiment by the first method described in relation to the first embodiment.

FIG. 19 is a chart illustrating an example of wheeling capacity values calculated at step S16, by the wheeling plan generator of the second embodiment, based on the operation plans illustrated in FIG. 16, on the wheeling request amounts illustrated in FIG. 17, and on the wheeling necessity values illustrated in FIG. 18.

FIG. 20 is a chart illustrating an example of wheeling plans for the respective electricity customers generated using the wheeling capacity values illustrated in FIG. 19 using the processing procedure illustrated in FIG. 14.

FIG. 21 is a chart illustrating an example of the wheeling request amounts of the respective electricity customers after the rearrangement at step S20.

FIG. 22 is a chart illustrating an example of wheeling necessity values calculated based on the wheeling request amounts of the respective electricity customers after the rearrangement illustrated in FIG. 21.

FIG. 26 is a chart illustrating an example of wheeling request amounts at the time t calculated at step S21 by the energy management systems of the respective customers.

FIG. 27 is a chart illustrating an example of power supply plans and power generation costs at the time t of the third embodiment.

FIG. 28 is a chart illustrating an example of power margin and power tightness amounts at the time t calculated based on the demand power amounts illustrated in FIG. 26 and on the power supply plans illustrated in FIG. 27.

FIG. 29 is a chart illustrating an example of wheeling costs of the customers for respective wheeling request amount ranges, calculated based on the power margin and power tightness amounts illustrated in FIG. 28, and on the power supply plans and the power generation costs illustrated in FIG. 27.

FIG. 30 is a chart illustrating an example of wheeling necessity values calculated using the power margin and power tightness amounts illustrated in FIG. 28, and using the loss costs illustrated in FIG. 8 related to the first embodiment.

FIG. 31 is a chart illustrating wheeling capacity values of the respective electricity customers calculated based on the operation plans of FIG. 27, and on the wheeling request amounts and the wheeling costs of FIG. 29.

FIG. 32 is a chart illustrating an example of wheeling plans determined based on the wheeling capacity values illustrated in FIG. 31.

FIG. 33 is a chart illustrating an example of wheeling request amounts of the respective electricity customers after the rearrangement.

FIG. 34 is a chart illustrating wheeling necessity values of the respective electricity customers after the rearrangement.

FIG. 35 is a chart illustrating an example of wheeling costs of the electricity customers for the respective wheeling request amount ranges after the rearrangement.

DESCRIPTION OF EMBODIMENTS

An electricity wheeling control apparatus, an electricity wheeling control method, and an electricity wheeling control system according to embodiments of the present invention will be described in detail below with reference to the drawings. Note that the present invention is not limited to these embodiments.

First Embodiment

Figure 1:
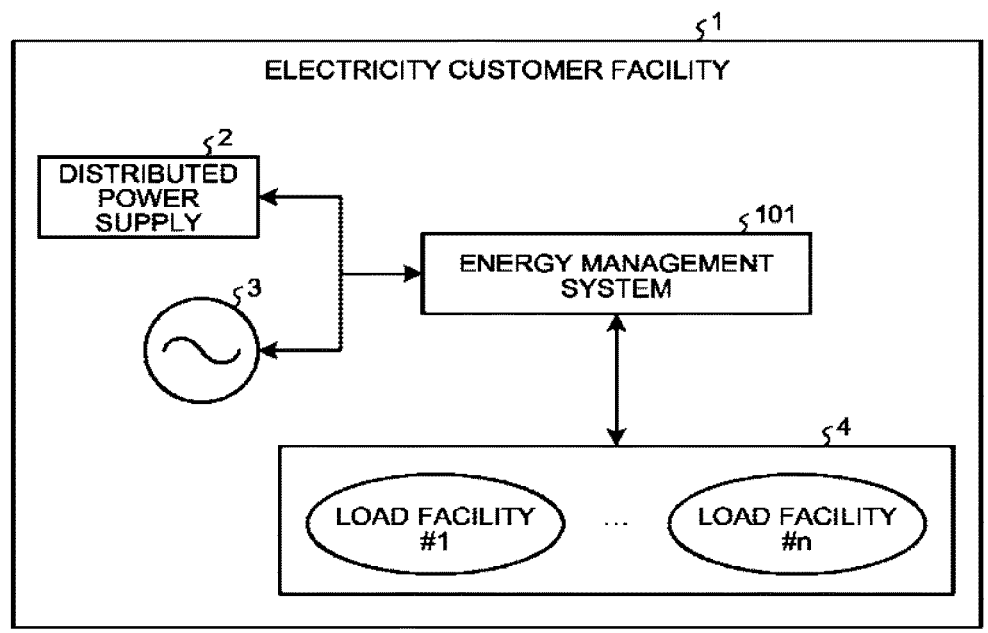
FIG. 1 is a diagram illustrating an example configuration of an electricity customer facility in an electricity customer having an energy management system that serves as an electricity wheeling control apparatus of a first embodiment.

FIG. 1 is a diagram illustrating an example configuration of an electricity customer facility (hereinafter referred to simply as "customer facility") in an electricity customer having an energy management system that serves as an electricity wheeling apparatus of a first embodiment according to the present invention. A customer facility 1 includes an energy management system 101, a distributed power supply 2, and a load system 4. The load system 4 includes a load facility #1 to a load facility #n, where n is an integer greater than or equal to 1. That is, the energy management system 101 of the first embodiment is an electricity wheeling control apparatus in an electricity customer possessing the distributed power supply 2 and the load system 4.

The load system 4 and the distributed power supply 2 are connected to a power system 3. Examples of the distributed power supply 2 include a power generation facility that generates power, a storage battery that stores and supplies electrical power, and an electric vehicle. Examples of the power generation facility include power generation facilities that utilize renewable energy and the like, such as solar power generation and wind power generation facilities, and non-utility generation facilities that utilize fossil fuel and the like. The load facilities #1 to #n are facilities such as a light and an air conditioner, and are facilities that consume power in that electricity customer. The energy management system 101 manages the distributed power supply 2 and the load system 4, and performs electricity wheeling control processing described later herein according to the present embodiment.

The customer facility 1 in the present embodiment is assumed to be any customer facility managed by the energy management system 101. Examples of the customer facility 1 include facilities such as a house, a multi-dwelling unit, a factory, and a building, but the customer facility 1 is not limited to these facilities, and may also be a piece of equipment in a facility such as a house, a multi-dwelling unit, a factory, or a building, or otherwise, equipment installed over multiple facilities.

Figure 2:
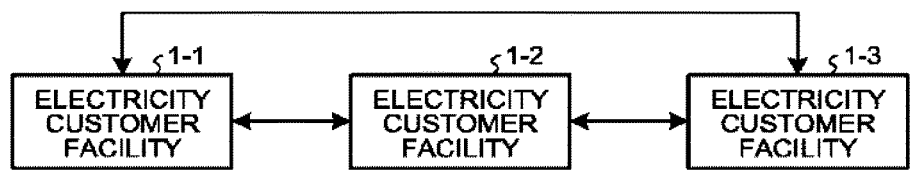
FIG. 2 is a diagram illustrating an example of relationships among customer facilities of the first embodiment.

FIG. 2 is a diagram illustrating an example of relationships among customer facilities of the first embodiment. Each of customer facilities 1-1 to 1-3 includes similar devices to those of the customer facility 1 as illustrated in FIG. 1. However, the specific devices of the distributed power supplies 2 thereof and the specific devices of the load system 4 thereof may differ from one another depending on the customer facilities 1-1 to 1-3. The present embodiment assumes that all of these customer facilities are connected to one another in terms of electrical path and of information channel. As used herein, an electrical path refers to, for example, a power distribution line in a power system. An information channel refers to, for example, a wired or wireless communication network.

Figure 3:
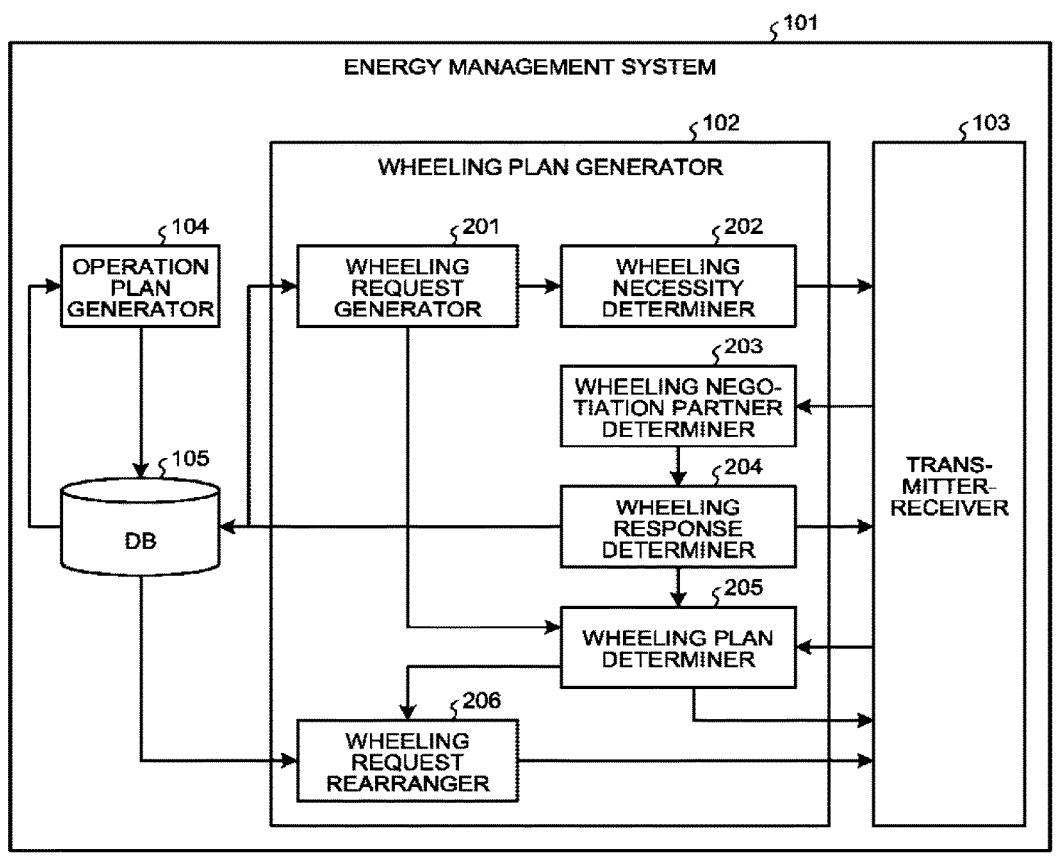
FIG. 3 is a diagram illustrating an example configuration of an energy management system of the first embodiment.

FIG. 3 is a diagram illustrating an example configuration of the energy management system 101 of the first embodiment. The energy management system 101 is constituted by an operation plan generator 104 that generates an operation plan for the customer facility 1; a wheeling plan generator 102 that generates a wheeling plan on the basis of a wheeling request in terms of electricity reception or electricity transmission, received from another energy management system 101, and on the basis of the wheeling capacity value; a transmitter-receiver 103 that sends and receives information to and from another energy management system 101; and a database storage 105. In FIG. 3, the database storage 105 is indicated by a reference symbol "DB."

The operation plan generator 104 generates an operation plan for the distributed power supply 2 and a plan of purchase from the power system 3 on the basis of a demand plan for the load system 4, on the basis of the state and/or specifications of the distributed power supply 2, and on the basis of the amount of electricity purchasable from the power system 3. The operation plan generator 104 then stores the operation plan generated, in the database storage 105. An operation plan is generated so that the state and/or specifications of the distributed power supply 2 or the amount of electricity purchasable from the power system 3 is used as the upper or lower limit for the planning, and the limit will not be exceeded. A demand plan for the load system 4 includes a set of amounts of demand power for respective time periods. The demand plan for the load system 4 may be generated based on a history of the amount(s) of electricity used in the past by the load system 4, or may be previously configured by a user or the like. If a history of the amount(s) of electricity used in the past by the load system 4 is to be used, the energy management system 101 is capable of measuring the amount of electricity used by the load system 4, or obtaining the amount of electricity used by the load system 4 from a measurement device provided in the customer facility.

The demand plan for the load system 4 may be generated depending on the season and/or the day of the week. If the demand plan for the load system 4 is generated from a history of the amount(s) of electricity used in the past by the load system 4, a method of, for example, using an average of the amounts of electricity used in the past for each of time periods may be used. A power supply plan includes a set of amounts of supply power (hereinafter also referred to as "supply power amounts") for respective time periods. The power supply plan includes a power supply plan of the amounts of supply power supplied from the distributed power supply 2. The power supply plan may include an amount of electricity purchased by the customer from an operator or other entity. The power supply plan for the distributed power supply 2 may be generated based on a history of the amount(s) of power supply in the past supplied by the distributed power supply 2, or may be previously configured by a user or the like. An operation plan is constituted by a set of demand power amounts and a set of supply power amounts for respective time periods.

The wheeling plan generator 102 includes a wheeling request generator 201, a wheeling necessity determiner 202, a wheeling negotiation partner determiner 203, a wheeling response determiner 204, a wheeling plan determiner 205, and a wheeling request rearranger 206.

The wheeling request generator 201 determines whether there will be an excess or deficiency of electricity on the basis of the operation plan stored in the database storage 105, and thus generates a wheeling request. That is, the wheeling request generator 201 generates a wheeling request including a wheeling request amount that represents an amount of wheeling electricity to be requested, on the basis of the operation plan for the distributed power supply 2 and on the basis of the electricity purchase plan.

The wheeling necessity determiner 202 calculates a wheeling necessity value on the basis of the wheeling request amount. Specifically, for example, the wheeling necessity determiner 202 calculates the wheeling necessity value of that customer itself on the basis of whether there will be an excess or deficiency of electricity and a loss cost due to an excess or deficiency of electricity. The wheeling negotiation partner determiner 203 determines a customer facility to negotiate with about wheeling on the basis of wheeling necessity values received from other customer facilities. That is, the wheeling negotiation partner determiner 203, which serves as a negotiation partner determiner, determines a negotiation partner who is an electricity customer to negotiate with about wheeling, on the basis of the wheeling necessity values received from the electricity wheeling control apparatuses of other electricity customers.

The wheeling response determiner 204 calculates a wheeling capacity value on the basis of wheeling request amounts received from other customer facilities and on the basis of the operation plan for that customer facility, and outputs the wheeling capacity value to the transmitter-receiver 103. That is, the wheeling response determiner 204 calculates, for each of the negotiation partners, a wheeling capacity value that represents the amount of electricity that can be allocated to that negotiation partner, on the basis of the wheeling request amounts received from the electricity wheeling control apparatuses of other electricity customers, and on the basis of the operation plan. The wheeling response determiner 204 then sends the wheeling capacity value to the electricity wheeling control apparatus of the negotiation partner via the transmitter-receiver 103. The wheeling plan determiner 205 fixes a wheeling plan on the basis of the wheeling capacity values from other customer facilities and on the basis of the wheeling request amount of that customer facility. That is, the wheeling plan determiner 205 determines a wheeling plan on the basis of the wheeling capacity values received from the electricity wheeling control apparatuses of other electricity customers, and on the basis of the wheeling request amount calculated by the wheeling request generator 201. The wheeling request rearranger 206 rearranges the wheeling request if details of electricity wheeling between customer facilities are not yet fixed.

Figure 4:
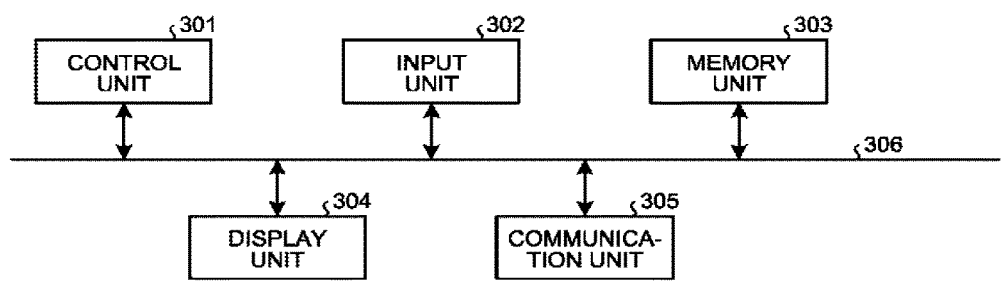
FIG. 4 is a diagram illustrating an example hardware configuration of the energy management system of the first embodiment.

FIG. 4 is a diagram illustrating an example hardware configuration of the energy management system 101 of the present embodiment. The energy management system 101 is implemented in a computing system, i.e., a computer, as exemplified in FIG. 4. Execution of a program for the energy management system on this computing system causes the computing system to function as the energy management system 101. As illustrated in FIG. 4, this computing system includes a control unit 301, an input unit 302, a memory unit 303, a display unit 304, and a communication unit 305. These components are connected to one another via a system bus 306.

In FIG. 4, the control unit 301 is a processor such as a central processing unit (CPU) or a micro-processing unit (MPG), and executes a program for the energy management system of the present embodiment. The input unit 302 is constituted by, for example, a keyboard, a mouse, and other device, and is used for the user of the computing system to input various pieces of information. The memory unit 303 includes various types of memory, such as a random access memory (RAM) and a read-only memory (ROM), and a storage device such as a hard disk drive. The memory unit 303 stores a program or programs to be executed by the control unit 301, necessary data obtained during processing, and the like. The memory unit 303 is also used as a temporary storage area for execution of a program by the control unit 301.

The display unit 304 is formed of a liquid crystal display panel (LCD) and/or the like, and displays various screens for the user of the computing system. The communication unit 305 is a transmitter and receiver, and performs communication with other devices.

An example operation of the computing system to make executable an electricity wheeling control program according to the present invention will now be described. For example, the program for the energy management system is installed from a compact disc (CD)-ROM or from a digital versatile disc (DVD)-ROM loaded in a CD-ROM or DVD-ROM drive (not illustrated) to the computing system having a configuration described above. Upon execution of the program for the energy management system, the program for the energy management system read from the memory unit 303 is stored in a predetermined location of the memory unit 303. In this arrangement, the control unit 301 performs processing of the energy management system 101, including the electricity wheeling control processing according to the present embodiment, following the program stored in the memory unit 303.

Note that although the present embodiment assumes that the program describing demand/supply control generation processing is provided via a CD-ROM or DVD-ROM as a recording medium, the program distribution method is not limited thereto, and a program may be provided, for example, via a transmission medium such as the Internet through the communication unit 305 depending on the configuration of the computing system, the size of the program distributed, and/or the like.

The wheeling plan generator 102 and the operation plan generator 104 illustrated in FIG. 3 are implemented by the control unit 301 illustrated in FIG. 4 executing the program. The database storage 105 illustrated in FIG. 3 is the memory unit 303 illustrated in FIG. 4. The transmitter-receiver 103 illustrated in FIG. 3 is included in the communication unit 305 illustrated in FIG. 4.

Figure 5:
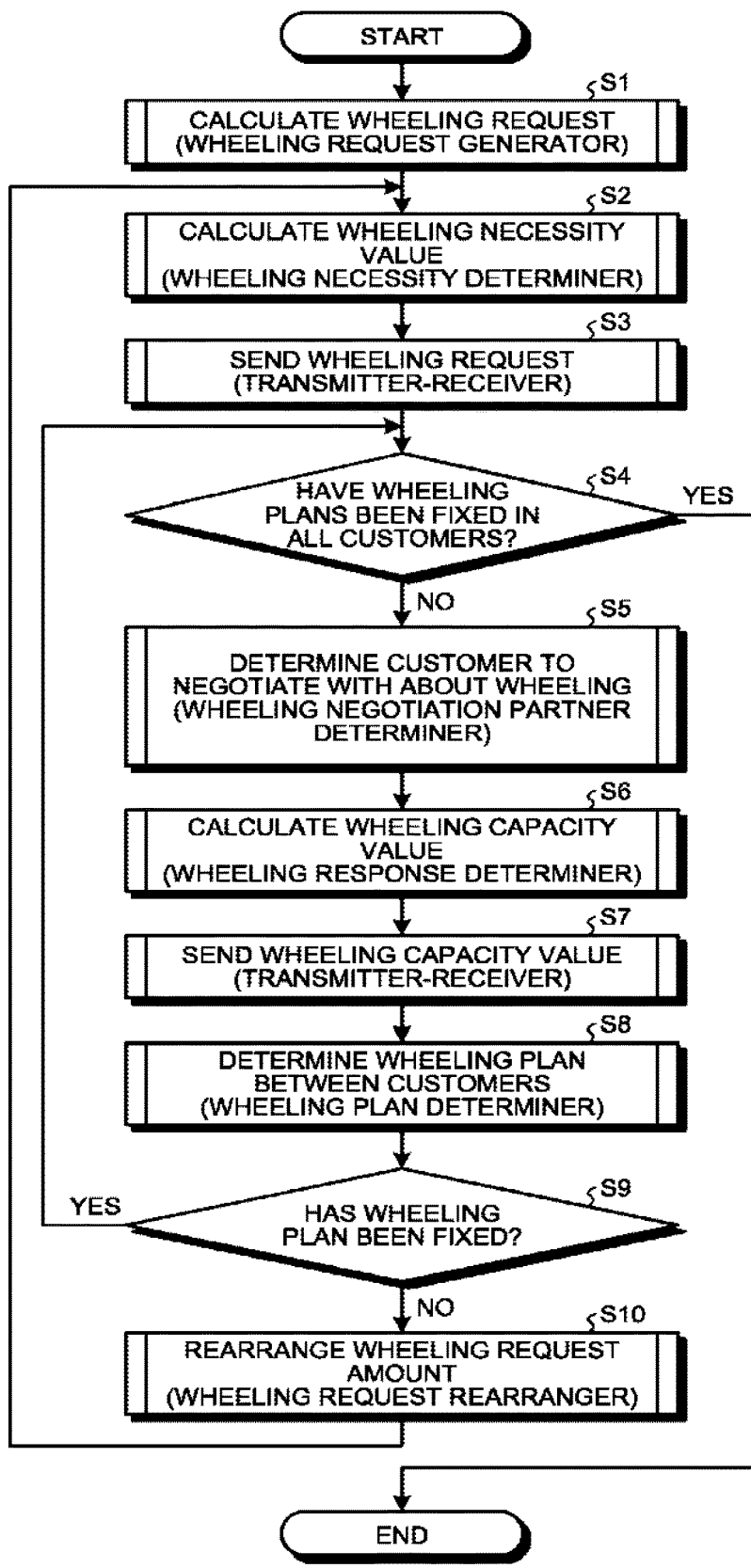
FIG. 5 is a flowchart illustrating an example of a wheeling plan generation procedure performed in a wheeling plan generator of the first embodiment.

FIG. 5 is a flowchart illustrating an example of a wheeling plan generation procedure performed in the wheeling plan generator 102 of the first embodiment. First, the wheeling request generator 201 of the wheeling plan generator 102 checks whether there will be an excess or deficiency of electricity in that facility based on the operation plan, and calculates the wheeling request amount based on the check result (step S1). Specifically, the wheeling request generator 201 calculates the wheeling request amount by subtracting the demand power amount from the supply power amount. That is, in this case, the wheeling request amount is obtained by subtracting the demand power amount from the supply power amount calculated based on the operation plan for the distributed power supply 2 and on the plan of purchase from the power system 3. Note that a demand power amount greater than the supply power amount results in a wheeling request amount having a positive value. A positive wheeling request amount means that there will be excess electricity, while a negative wheeling request amount means that there will be electricity deficiency. That is, for a positive wheeling request amount, the absolute value of the wheeling request amount represents the absolute value of the amount of excess electricity, while for a negative wheeling request amount, the absolute value of the wheeling request amount represents the absolute value of the amount of electricity deficiency.

FIG. 6 is a chart illustrating a set of operation plans at a certain time t arranged by the electricity customer, of the operation plans generated by the operation plan generators 104 of the energy management systems 101 of the respective customers. The electricity customers corresponding to the customer facilities 1-1 to 1-3 illustrated in FIG. 2 are herein respectively referred to as electricity customers 1-1 to 1-3. The term "electricity customer" is hereinafter also referred to simply as "customer." In the example illustrated in FIG. 6, the demand power amounts at the time t in the operation plans are: 90 kWh for the electricity customer 1-1, 120 kWh for the electricity customer 1-2, and 100 kWh for the electricity customer 1-3. In addition, in the example illustrated in FIG. 6, the supply power amounts at the time t in the operation plans are: 110 kWh for the electricity customer 1-1, 110 kWh for the electricity customer 1-2, and 90 kWh for the electricity customer 1-3.

FIG. 7 is a chart illustrating the wheeling request amounts (i.e., amounts of excess electricity or electricity deficiency) at the time t, calculated in the energy management systems 101 of the respective customers based on the operation plans illustrated in FIG. 6. As illustrated in FIG. 7, the electricity wheeling amounts at the time t are: 20 kWh for the electricity customer 1-1, −10 kWh for the electricity customer 1-2, and −10 kWh for the electricity customer 1-3.

Returning back to FIG. 5, next, the wheeling necessity determiner 202 of the wheeling plan generator 102 calculates a wheeling necessity value based on the wheeling request amount (i.e., amount of excess electricity or electricity deficiency) and based on a loss cost due to an excess or deficiency of electricity (step S2). A loss cost is a loss represented in cost, i.e., an amount of money, resulting from failure to fully manage the excess or deficiency of electricity occurred in an electricity customer. A wheeling necessity value may be calculated using a first method in which the absolute value of the wheeling request amount is multiplied by a predetermined loss cost, using a second method in which the absolute value of the wheeling request amount is used as the wheeling necessity value, using a third method in which the loss cost is used as the wheeling necessity value, or using other method.

FIG. 8 is a chart illustrating an example of loss costs incurred by the respective electricity customers when the first method is used. As illustrated in FIG. 8, the electricity customer 1-1 has a loss cost of 20, the electricity customer 1-2 has a loss cost of 10, and the electricity customer 1-3 has a loss cost of 5. FIG. 9 is a chart illustrating an example of wheeling necessity values when the first method is used. The value of the loss cost is stored in the database storage 105 of the energy management system 101 in each of the customers. The wheeling necessity values for the respective electricity customers illustrated in FIG. 9 are examples of wheeling necessity values that are calculated by the energy management systems 101 of the respective customers, based on the wheeling request amounts illustrated in FIG. 7 and on the loss costs illustrated in FIG. 8 using the first method. Thus, as illustrated in FIG. 9, the electricity customer 1-1 has a wheeling necessity value of 20×20=400, the electricity customer 1-2 has a wheeling necessity value of |−10|× 10=100, and the electricity customer 1-3 has a wheeling necessity value of |−10|×5=50.

Returning back to FIG. 5, next, the wheeling necessity determiner 202 of the wheeling plan generator 102 sends the wheeling request including the wheeling request amount and the wheeling necessity value calculated, to the transmitter-receiver 103, and the transmitter-receiver 103 in turn sends the wheeling request to the energy management systems 101 of other electricity customers (step S3). It is assumed herein that the wheeling request contains information for identifying the sender customer, and that the wheeling request is sent to the energy management systems 101 of all the other electricity customers, or of predetermined multiple electricity customers designated as the candidates for the negotiation callee. In this example, the electricity customers 1-1 to 1-3 are assumed to be the entirety of the electricity customers.

Next, the wheeling plan generator 102 determines whether the wheeling plans have been fixed in all the customers (step S4). As used herein, "all the customers" may also refer to the predetermined multiple electricity customers designated as the candidates for the negotiation calico as described above. Note that, as described later herein, the energy management system 101 of each customer informs all the other customers that the wheeling plan has been fixed, upon or after determination of the wheeling plan. If the wheeling plans have been fixed in all the customers (Yes at step S4), the wheeling plan generator 102 terminates the process. If the wheeling plan is unfixed in any customer (No at step S4), the process proceeds to step S5.

At step S5, the wheeling negotiation partner determiner 203 of the wheeling plan generator 102 determines the wheeling negotiation partner, who is an electricity customer to negotiate with about wheeling, on the basis of the wheeling necessity values included in the wheeling requests received via the transmitter-receivers 103 from the energy management systems 101 of other electricity customers (step S5). The wheeling negotiation partner may be determined such that an electricity customer having a higher wheeling necessity value is given higher priority in determination of the wheeling negotiation partner.

For example, assuming that the electricity customers have the wheeling necessity values illustrated in FIG. 9, the wheeling negotiation partner determiner 203 of the energy management system 101 of the electricity customer 1-1 determines that the electricity customer 1-2 is the first priority wheeling negotiation partner, and the electricity customer 1-3 is the second priority wheeling negotiation partner because the wheeling request received from the electricity customer 1-2 includes a wheeling necessity value of 100, while the wheeling request received from the electricity customer 1-3 includes a wheeling necessity value of 50. Similarly, the wheeling negotiation partner determiner 203 of the energy management system 101 of the electricity customer 1-2 determines that the electricity customer 1-1 and the electricity customer 1-3 are, respectively, the first priority wheeling negotiation partner and the second priority wheeling negotiation partner; and the wheeling negotiation partner determiner 203 of the energy management system 101 of the electricity customer 1-3 determines that the electricity customer 1-1 and the electricity customer 1-2 are, respectively, the first priority wheeling negotiation partner and the second priority wheeling negotiation partner. That is, the wheeling negotiation partner determiner 203 prioritizes negotiation partners such that higher priority is given to a negotiation partner having a higher wheeling necessity value among the wheeling necessity values received from the electricity wheeling control apparatuses of other electricity customers, among the negotiation partners.

Returning back to FIG. 5, next, the wheeling response determiner 204 of the wheeling plan generator 102 calculates a wheeling capacity value using the wheeling request amount of the electricity customer who is a wheeling negotiation partner received via the transmitter-receiver 103, and using the operation plan for that customer (step S6). The wheeling response determiner 204 informs the transmitter-receiver 103 of the wheeling capacity value and the wheeling negotiation partner. The transmitter-receiver 103 sends the wheeling capacity value to the energy management system 101 of the wheeling negotiation partner (step S7).

FIG. 10 is a chart illustrating wheeling capacity values calculated using the operation plans illustrated in FIG. 6 and the wheeling request amounts illustrated in FIG. 7. In FIG. 10, each row corresponds to a negotiation caller, i.e., a customer sending a wheeling request, and each column corresponds to a negotiation callee, i.e., a customer that is a wheeling negotiation partner. In the case of the energy management system 101 of the electricity customer 1-1, the electricity customer 1-2, who is the first priority wheeling negotiation partner, has a wheeling request amount of −10 kWh, while the customer itself, i.e., the electricity customer 1-1, has a wheeling request amount of 20 kWh. Thus, the energy management system 101 of the electricity customer 1-1 determines that the excess electricity thereof can be used to compensate for the deficiency of the electricity customer 1-2, and determines the wheeling capacity value for the electricity customer 1-2 to be −10 kWh. As described above, the absolute value of a positive wheeling request amount represents the absolute value of the amount of excess electricity. In addition, a negative wheeling capacity value indicates that electricity is transmitted from the negotiation caller to the negotiation callee, i.e., the wheeling negotiation partner, while a positive wheeling capacity value indicates that electricity is received by the negotiation caller from the negotiation callee.

Even after addition of the wheeling capacity value of −10 kWh for the electricity customer 1-2 to the wheeling capacity value of 20 kWh of the electricity customer 1-1, that is, even after subtraction of 10 kWh from 20 kWh, 10 kWh of excess electricity still remains. Therefore, the energy management system 101 of the electricity customer 1-1 assigns a wheeling capacity value of −10 kWh to the electricity customer 1-3, who is the second priority wheeling negotiation partner. Thus, the transmitter-receiver 103 sends, as the wheeling capacity value, a value of −10 kWh to the energy management system 101 of the electricity customer 1-2, and sends, as the wheeling capacity value, a value of −10 kWh to the energy management system 101 of the electricity customer 1-3. Note that when the transmitter-receiver 103 sends the wheeling capacity values, information indicating the sender energy management system 101 is added.

As described above, in a case in which the wheeling request amount of that customer itself is positive, and the wheeling request amount of the first priority wheeling negotiation partner is negative, and moreover, the absolute value of the wheeling request amount of that customer is greater than the absolute value of the wheeling request amount of the first priority wheeling negotiation partner, the wheeling response determiner 204 determines the wheeling capacity value for the first priority wheeling negotiation partner to be the same value as the wheeling request amount of the first priority wheeling negotiation partner. A similar process is applicable to the second priority wheeling negotiation partner in which the wheeling capacity value therefor is calculated based on the remaining wheeling request amount of that customer assuming that the electricity wheeling will be provided to the first priority wheeling negotiation partner. Also when the number of wheeling negotiation partners is three or more, the wheeling response determiner 204 calculates wheeling capacity values based on the priority, similarly. Otherwise, in a case in which the wheeling request amount of that customer is positive, and the wheeling request amount of the first priority wheeling negotiation partner is negative, and moreover, the absolute value of the wheeling request amount of that customer is less than the absolute value of the wheeling request amount of the first priority wheeling negotiation partner, the wheeling response determiner 204 determines the wheeling capacity value for the first priority wheeling negotiation partner to be a negative value having the same absolute value as the wheeling request amount of that customer itself. Moreover, in a case in which the wheeling request amount of that customer is positive, and the wheeling request amount of the wheeling negotiation partner is negative, and moreover, the absolute value of the remaining wheeling request amount of that customer is less than the absolute value of the wheeling request amount of the wheeling negotiation partner, the wheeling response determiner 204 determines the wheeling capacity value for the wheeling negotiation partner to be a negative value represented by a minus sign added to the figure of the remaining wheeling request amount of that customer. Note that a plus sign is omitted for a positive amount value of electricity.

Since the electricity customer 1-1, who is the first priority wheeling negotiation partner, has a wheeling request amount of 20 kWh, and the customer itself, i.e., the electricity customer 1-2, has a wheeling request amount of −10 kWh, the wheeling response determiner 204 of the energy management system 101 of the electricity customer 1-2 determines that an amount of electricity equivalent to the electricity deficiency of that customer can be supplied from the electricity customer 1-1, and thus determines the wheeling capacity value for the electricity customer 1-1 to be 10 kWh. In the electricity customer 1-2, the electricity reception from the first priority wheeling negotiation partner causes the amount of the electricity deficiency of the electricity customer 1-2 to be 0, and therefore a wheeling capacity value is not calculated any further for the second priority wheeling negotiation partner.

As described above, in a case in which the wheeling request amount of that customer itself is negative, and the wheeling request amount of the first priority wheeling negotiation partner is positive, and moreover, the absolute value of the wheeling request amount of that customer is less than the absolute value of the wheeling request amount of the first priority wheeling negotiation partner, the wheeling response determiner 204 determines the wheeling capacity value for the first priority wheeling negotiation partner to be a positive value having the same absolute value as the wheeling request amount of that customer. Otherwise, in a case in which the wheeling request amount of that customer is negative, and the wheeling request amount of the first priority wheeling negotiation partner is positive, and moreover, the absolute value of the wheeling request amount of that customer is greater than the absolute value of the wheeling request amount of the first priority wheeling negotiation partner, the wheeling response determiner 204 determines the wheeling capacity value for the first priority wheeling negotiation partner to be the same value as the wheeling request amount of the first priority wheeling negotiation partner. In addition, a similar process is applicable to the second priority wheeling negotiation partner in which the wheeling capacity value therefor is calculated based on the remaining wheeling request amount of that customer assuming that the electricity wheeling will be provided to the first priority wheeling negotiation partner.

In a case in which the wheeling request amount of that customer facility is negative, and the wheeling request amount of the wheeling negotiation partner is positive, and moreover, the absolute value of the remaining wheeling request amount of that customer is less than the absolute value of the wheeling request amount of the wheeling negotiation partner, the wheeling response determiner 204 determines the wheeling capacity value for the wheeling negotiation partner to be a positive value represented by a plus sign added to the figure of the remaining wheeling request amount of that customer. Note that if the wheeling request amount of that customer and the wheeling request amount of the wheeling negotiation partner have a same plus or minus sign, the wheeling response determiner 204 determines the wheeling capacity value for the wheeling negotiation partner to be 0 kWh.

As described above, the wheeling response determiner 204 assigns the wheeling request amounts calculated by the wheeling request generator 201 to the negotiation partners sequentially in order of priority.

Similarly, the wheeling response determiner 204 of the energy management system 101 of the electricity customer 1-3 determines the wheeling capacity value for the electricity customer 1-1, who is the first priority wheeling negotiation partner, to be 10 kWh.

Returning back to FIG. 5, after step S7, the wheeling plan determiner 205 determines a wheeling plan on the basis of the wheeling capacity value calculated by the wheeling response determiner 204 (step S8). Then, the wheeling plan determiner 205 determines whether the wheeling plan has been fixed (step S9). Specifically, the wheeling plan determiner 205 determines that the wheeling plan has been fixed if the wheeling request amount of that customer itself is consistent with the wheeling capacity value received from other customer, and determines that the wheeling plan is unfixed if the wheeling request amount of that customer itself is inconsistent with the wheeling capacity value received from other customer. That "the wheeling request amount of that customer itself is consistent with the wheeling capacity value received from other customer" means that the deficiency or excess of electricity indicated by the wheeling request amount will be cancelled out by the amount of electricity to be transmitted or received indicated by the wheeling capacity value.

For example, as illustrated in FIG. 7, the energy management system 101 of the electricity customer 1-1 knows that the electricity customer 1-1 will have excess electricity of 20 kWh at the time t. Meanwhile, by reception of notification of wheeling capacity values from the energy management systems 101 of the electricity customer 1-2 and of the electricity customer 1-3, the energy management system 101 of the electricity customer 1-1 learns that the electricity customer 1-1 has a capacity of transmitting 10 kWh of electricity to each of the electricity customer 1-2 and electricity customer 1-3 as illustrated in FIG. 10, and thus determines that this will cancel out the excess electricity of 20 kWh. Therefore, the energy management system 101 of the electricity customer 1-1 fixes the wheeling plans of that customer itself for all the customers.

For example, in the example illustrated in FIG. 10, the wheeling response determiner 204 has calculated the wheeling capacity value for the electricity customer 1-2 as −10 kWh, and therefore, if the wheeling capacity value received from the electricity customer 1-2 is 10 kWh, then the wheeling plan determiner 205 of the electricity customer 1-1 determines, with respect to the electricity customer 1-2, that the wheeling capacity value calculated by the wheeling response determiner 204 is consistent with the wheeling capacity value received from other customer. If the wheeling capacity value is consistent with the wheeling capacity value received from other customer for all the other electricity customers, the wheeling plan determiner 205 determines that the wheeling plan has been fixed. If the wheeling plan has been fixed, the wheeling plan determiner 205 of the electricity customer 1-1 informs all the electricity customers that the wheeling plan has been fixed, via the transmitter-receiver 103.

If the wheeling plan has been fixed (Yes at step S9), the process returns to step S4. Otherwise, if the wheeling plan is unfixed (No at step S9), the wheeling request rearranger 206 rearranges the wheeling request amount (step S10), and the process returns to step S2. At step S10, if the wheeling capacity value calculated by that customer is inconsistent with the wheeling capacity value received, the wheeling request amount is updated with the remaining amount, and the process returns to step S2. For example, let us assume here that the electricity customer 1-1 has a wheeling request amount of −30 kWh, and the energy management system 101 of the electricity customer 1-1 learns from the wheeling capacity values received from the energy management systems 101 of the electricity customer 1-2 and of the electricity customer 1-3 that 10 kWh of electricity can be received from each of the electricity customer 1-2 and the electricity customer 1-3. In this case, 10 kWh of electricity deficiency will still remain even if electricity is supplied from the electricity customer 1-2 and from the electricity customer 1-3, and thus the energy management system 101 of the electricity customer 1-1 updates the corresponding wheeling request amount with a value of −10 kWh, and the process returns to step S2.

Figures 12, 13:
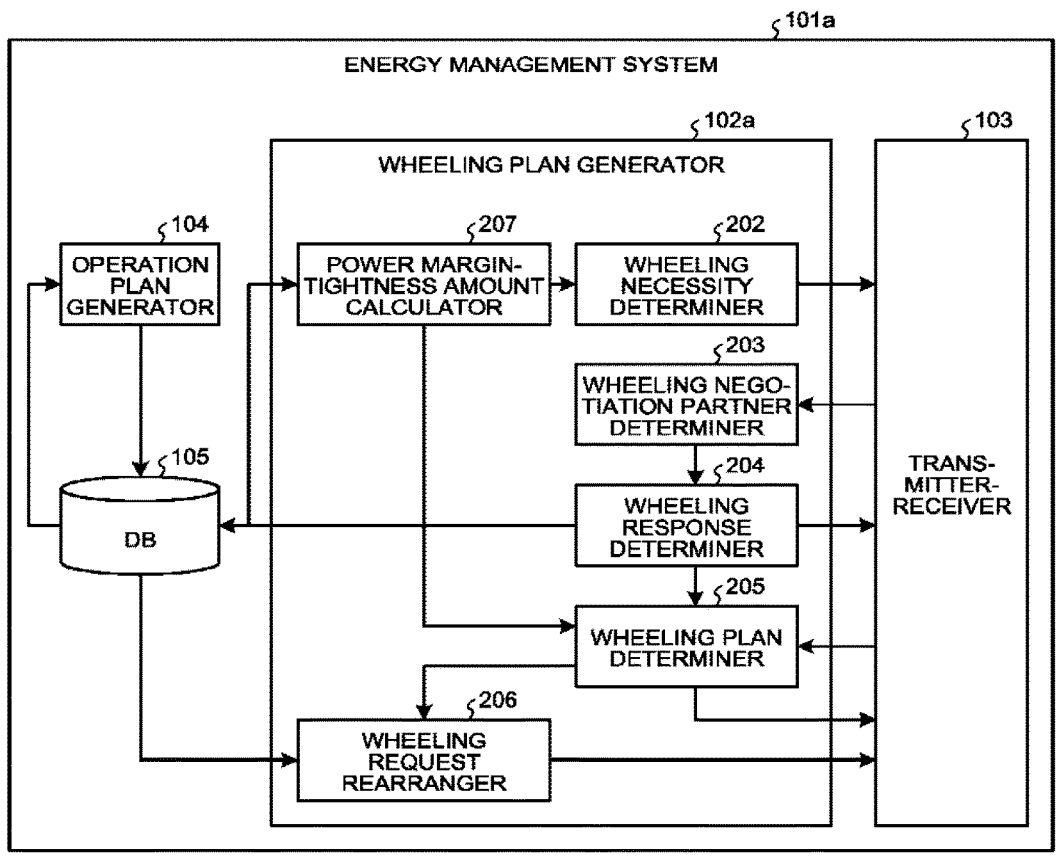
FIG. 12 is a chart illustrating wheeling plans calculated based on the wheeling capacity values illustrated in FIG. 10.
FIG. 13 is a diagram illustrating an example configuration of an energy management system according to a second embodiment.

FIG. 11 is a chart illustrating an example of the fixed wheeling plans of the respective customers. FIG. 12 is a chart illustrating wheeling plans calculated based on the wheeling capacity values illustrated in FIG. 10. In this case, as illustrated in FIG. 10, the wheeling request amount is consistent with the wheeling capacity values received from the other customers for all the customers, and thus the energy management system 101 of each customer determines the wheeling plan on the basis of the wheeling capacity values received from the other customers. Accordingly, the wheeling capacity values illustrated in FIG. 10 and the wheeling capacity values in the wheeling plans illustrated in FIG. 12 match.

As described above, in the present embodiment, the wheeling plan generator 102 calculates a wheeling necessity value and a wheeling request amount, sends the wheeling necessity value and the wheeling request amount to other customer(s), and determines the customer who is the electricity wheeling partner on the basis of the wheeling necessity values. Then, the wheeling plan generator 102 calculates the wheeling capacity value for the customer who is the electricity wheeling partner, sends the wheeling capacity value to other customer(s), and determines the wheeling plan on the basis of the wheeling capacity value calculated and the wheeling capacity value received. Thus, the energy management system 101 of the present embodiment is capable of determining the electricity customer that should be the wheeling negotiation partner depending on the wheeling necessity values even when wheeling requests are simultaneously received from multiple electricity customers, and is therefore capable of determining an appropriate electricity wheeling amount with respect to each electricity customer.

Second Embodiment

Next, an energy management system according to a second embodiment will be described. In the first embodiment, an amount of electricity wheeling is negotiated between electricity customers upon occurrence of excess electricity or electricity deficiency to perform electricity wheeling. However, depending on the application of the distributed power supply by the electricity customer, excess electricity and electricity deficiency may mean differently. For example, depending on the time period, an electricity customer having a storage battery as the distributed power supply may purchase the entire amount of electricity from a utility company, and thus use no electricity accumulated in the storage battery. In such case and during this time period, the amount of electricity that can be supplied from the storage battery may be considered as a power margin amount. Otherwise, an electricity customer having a power generator as the distributed power supply may not be able to meet the electricity demand of that customer only by the electricity purchased from a utility company, and thus operate the power generator to compensate for the electricity deficiency depending on the time period. However, power generation cost relating to a power generator can typically be higher than the cost of electricity purchased from a utility company. Accordingly, even though there is no electricity deficiency seemingly, power supply can be considered as being tight.

The wheeling plan generator 102 of the first embodiment determines whether there is excess or deficiency of electricity based on the supply power amount relative to the demand power amount, and therefore does not perform electricity wheeling in a situation as described above. An energy management system according to the second embodiment calculates a power margin amount and a power tightness amount to enable electricity wheeling even when there is no excess or deficiency of electricity.

FIG. 13 is a diagram illustrating an example configuration of an energy management system 101a according to the second embodiment of the present invention. The same reference characters as those of the first embodiment are used to designate elements having functions similar to those of the first embodiment, and the explanation thereof will be omitted. The differences from the first embodiment will be described below.

The energy management system 101a of the second embodiment is similar to the energy management system of the first embodiment except that the energy management system 101a includes a wheeling plan generator 102a in place of the wheeling plan generator 102. The wheeling plan generator 102a is similar to the wheeling plan generator 102 of the first embodiment except that the wheeling plan generator 102a includes a power margin-tightness amount calculator 207 in place of the wheeling request generator 201. The power margin-tightness amount calculator 207 calculates a power margin amount and a power tightness amount based on the operation plan for each facility relative to the amount of electricity demand of that customer itself.

Similarly to the energy management system 101 of the first embodiment, the energy management system 101a of the present embodiment is implemented in the computing system illustrated in FIG. 4. The wheeling plan generator 102a is implemented by the control unit 301 executing the program stored in the memory unit 303.

Figure 14:
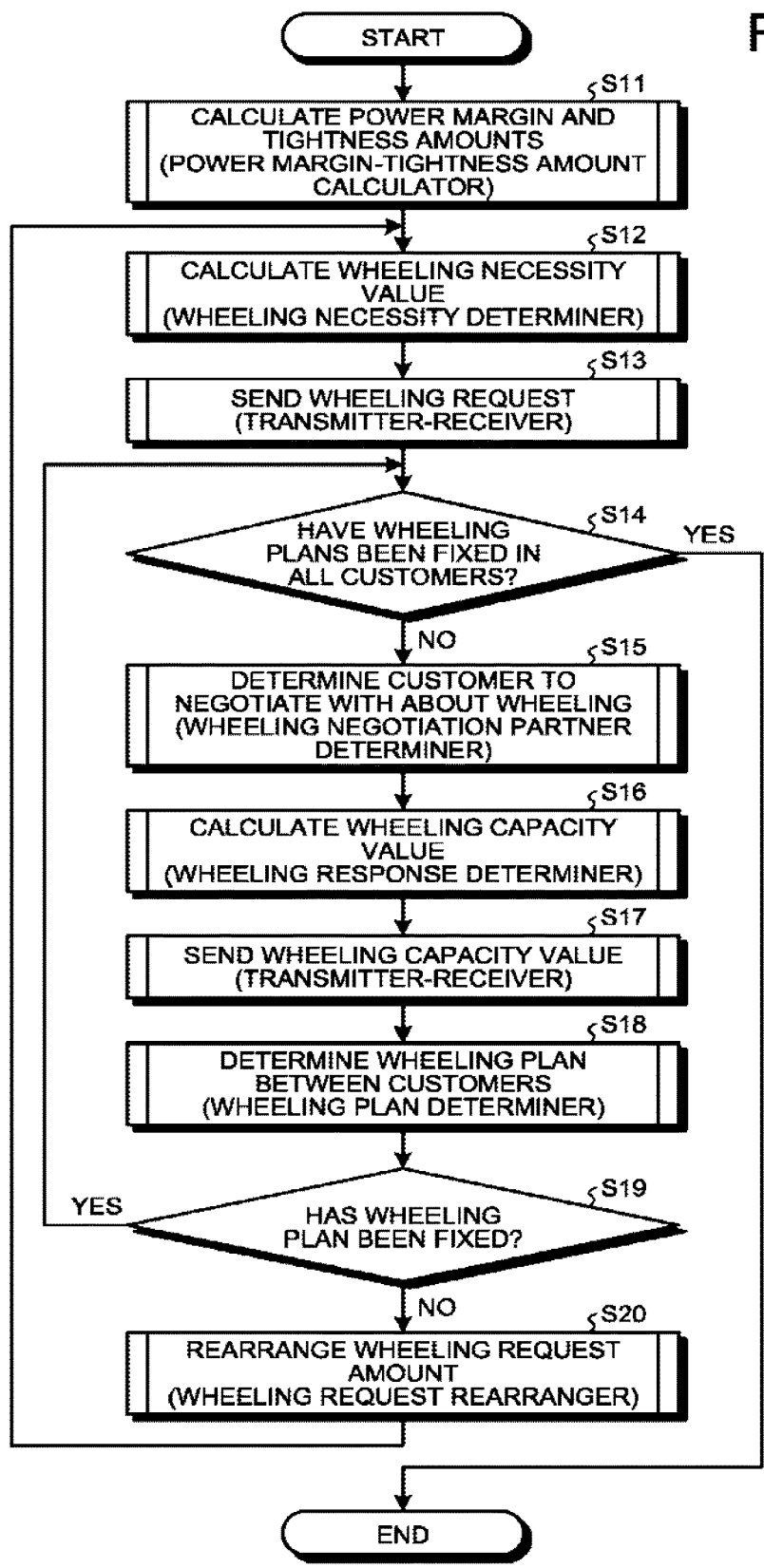
FIG. 14 is a flowchart illustrating an example of a wheeling plan generation procedure performed in a wheeling plan generator according to the second embodiment.

FIG. 14 is a flowchart illustrating an example of a wheeling plan generation procedure performed in the wheeling plan generator 102a of the second embodiment. First, the power margin-tightness amount calculator 207 of the wheeling plan generator 102a calculates an amount of power margin or tightness relative to the electricity demand in that facility on the basis of the operation plan, and determines to use the calculated amount of electricity as the wheeling request amount (step S11). The present embodiment assumes that the operation plan includes, as the power supply plan, a power supply plan relating to the distributed power supply 2 and an electricity purchase plan.

FIG. 15 is a chart illustrating an example of demand power amounts of the respective customers at the time t in the operation plans. FIG. 16 is a chart illustrating an example of power supply plans and device information of the respective customers at the time t. FIG. 16 illustrates details of the distributed power supply 2 possessed by each of the customers using the type of that distributed power supply 2. The types of the distributed power supply 2 include sunlight power generation facility, power generator, storage battery, etc. In FIG. 15, a positive value represents discharged power, and a negative value represents charged power. FIG. 16 illustrates minimum power and maximum power as the device information. The device information is previously stored in the database storage 105. The electricity purchase plan is previously generated by the user, or stored in the database storage 105 as information input by the user. FIG. 17 is a chart illustrating an example of wheeling request amounts (i.e., power margin or power tightness amounts) of the respective electricity customers, calculated based on the demand power amounts illustrated in FIG. 15 and on the operation plans and the device information of the distributed power supplies 2 illustrated in FIG. 16.

As illustrated in FIGS. 15 and 16, the electricity customer 1-1 has a total of purchased electricity and supplied electricity from the storage battery of 90 kWh and a demand power amount of 90 kWh at the time t. Thus the demand power amount can be met by the combination of the purchased electricity and the supplied electricity from the storage battery. Moreover, the electricity customer 1-1 has the purchased electricity with a maximum power of 100 kWh as compared to the planned value of 70 kWh at the time t, thereby leaving an amount of further purchasable electricity of 30 kWh. The electricity customer 1-2 cannot meet the demand power amount even if the amount of purchasable electricity and the amount of electricity generated by solar power generation are added together, which only results in a deficiency of −10 kWh.

The electricity customer 1-3 can meet the demand power amount by using the combination of the amount of purchasable electricity and the amount of electricity from the power generator. However, considering the fact that use of the power generator increases the cost, it is desirable that the electricity customer 1-3 avoid to use the power generator whenever possible. Thus, the amount of electricity supplied by the power generator, which is 50 kWh, is counted in the power tightness amount. That is, the wheeling request amount of the electricity customer 1-3 is determined to be −50 kWh. In the present embodiment, a positive wheeling request amount corresponds to power margin, and a negative wheeling request amount represents a power tightness amount. As used herein, the term "power tightness amount" includes both the amount of electricity deficiency in a case in which the demand power amount exceeds the supplied electricity, and the power tightness amount, which represents an amount of electricity that is better be unused if possible in view of a cost increase and/or for other reason even though the demand power amount falls below the supplied electricity. The power tightness amount is predefined. For example, the definition is previously made such that power supplied from the power generator is counted in the power tightness amount.

As described above, the wheeling request amount according to the present embodiment includes one of the followings: a value calculated by subtracting the demand power amount from the supply power amount calculated based on the operation plan for the distributed power supply 2 and on the electricity purchase plan; a power margin amount calculated based on the operation plan for the distributed power supply 2 and on the electricity purchase plan, and on a maximum amount of electricity that can be supplied, calculated based on the device information defined for each power source; and a power tightness amount calculated based on a cost per unit amount of electricity per power source. Specifically, for example, the amount having the largest absolute value among these values can be used as the wheeling request amount.

Returning back to FIG. 14, next, the wheeling necessity determiner 202 calculates a wheeling necessity value based on the wheeling request amount and the loss cost of that customer (step S12). The wheeling necessity value is calculated similarly to the first embodiment, and the loss cost may be similar to the loss cost of the first embodiment.

Note that the present embodiment assumes that the electricity customer 1-1 and the electricity customer 1-3 are in a situation of a certain power margin or tight power supply, and are not in a situation of excess electricity or electricity deficiency. Accordingly, in the second embodiment, if the wheeling request amount represents a power margin amount or a power tightness amount, the wheeling necessity determiner 202 may use the absolute value of the wheeling request amount directly as the wheeling necessity value without multiplication by the loss cost. That is, the wheeling necessity determiner 202 may use the absolute value of the wheeling request amount as the wheeling necessity value if the wheeling request amount represents a power margin amount or a power tightness amount, while the wheeling necessity determiner 202 may use, as the wheeling necessity value, a product of the absolute value of the wheeling request amount multiplied by the loss cost due to an excess or deficiency of electricity if the wheeling request amount is a value calculated by subtracting the demand power amount from the supply power amount.

FIG. 18 is a chart illustrating wheeling necessity values when the wheeling necessity values are calculated using the electricity wheeling amounts illustrated in FIG. 17 and the loss costs illustrated in FIG. 8 related to the first embodiment by the first method described in relation to the first embodiment. As illustrated in FIG. 18, for example, the electricity customer 1-1 has an electricity wheeling amount of 30 kWh, and since the value of 30 kWh represents a power margin amount, this value is not multiplied by the loss cost of 20, and thus the wheeling necessity value is determined to be 30. In contrast, the electricity customer 1-2 has an electricity wheeling amount of −10 kWh, and since the value of −10 kWh represents an electricity deficiency amount, the absolute value of the electricity wheeling amount is multiplied by the loss cost of 10. Thus, the wheeling necessity value is determined to be 100.

Returning back to FIG. 14, after step S12, the wheeling plan generator 102*a* of the second embodiment performs step S13 to step S20 similarly to step S3 to step S10 of the first embodiment. As described above, in the present embodiment, the wheeling request amount and the wheeling necessity value are calculated differently from the first embodiment, but the operation from step S14 to step S20 is similar to the first embodiment.

FIG. 19 is a chart illustrating an example of wheeling capacity values calculated at step S16, by the wheeling plan generator 102*a* of the second embodiment, based on the operation plans illustrated in FIG. 16, on the wheeling request amounts illustrated in FIG. 17, and on the wheeling necessity values illustrated in FIG. 18. First, the energy management system 101*a* of the electricity customer 1-1 determines that the electricity customer 1-2 is the first priority wheeling negotiation partner on the basis of the wheeling necessity values of the electricity customer 1-2 and of the electricity customer 1-3 that have been received. Then, based on the wheeling request amount of the electricity customer 1-2, which is −10 kWh, the energy management system 101*a* of the electricity customer 1-1 assigns 10 kWh as the amount of electricity to be transmitted to the electricity customer 1-2, from the wheeling capacity value of that customer itself which is 30 kWh.

Next, since the wheeling capacity value will still remain even after transmission of electricity to the electricity customer 1-2, the energy management system 101*a* of the electricity customer 1-1 assigns the remaining wheeling capacity value, which is 20 kWh, as the amount of electricity to be transmitted with respect to the wheeling request amount of the electricity customer 1-3, which is −50 kWh. As a result, the energy management system 101*a* of the electricity customer 1-1 sends the value of −10 kWh to the electricity customer 1-2 as the wheeling capacity value, and the value of −20 kWh to the electricity customer 1-3 as the wheeling capacity value.

By similar processing, the energy management system 101*a* of the electricity customer 1-2 will assign wheeling capacity values to the electricity customer 1-3 and to the electricity customer 1-1 sequentially in this order. However, since the wheeling request amount of the electricity customer 1-2 and the wheeling request amount of the electricity customer 1-3 have a same plus or minus sign, the wheeling capacity value for the electricity customer 1-3 is determined to be 0 kWh. Thus, the energy management system 101 of the electricity customer 1-2 assigns the wheeling request amount of that customer, which is −10 kWh, as the receive capacity for the electricity customer 1-1, with respect to the wheeling request amount of the electricity customer 1-1, which is 30 kWh. That is, the energy management system 101 of the electricity customer 1-2 determines the wheeling request amount for the electricity customer 1-1 to be 10 kWh.

By similar processing, the energy management system 101 of the electricity customer 1-3 will assign the wheeling capacity values of that customer itself to the electricity customer 1-2 and to the electricity customer 1-1 sequentially in this order. However, since the wheeling request amount of the electricity customer 1-3 and the wheeling request amount of the electricity customer 1-2 have a same plus or minus sign, the wheeling capacity value for the electricity customer 1-2 is determined to be 0 kWh. Thus, the energy management system 101 of the electricity customer 1-3 assigns the wheeling request amount of the electricity customer 1-1, which is 30 kWh, as the receive capacity for the electricity customer 1-1, with respect to the wheeling request amount of that customer, which is −50 kWh. That is, the energy management system 101 of the electricity customer 1-3 determines the wheeling request amount for the electricity customer 1-1 to be 30 kWh.

By the operation described above, the energy management system 101 of the electricity customer 1-1 sends a value of −10 kWh as the wheeling capacity value for the electricity customer 1-2, and a value of −20 kWh as the wheeling capacity value for the electricity customer 1-3. The energy management system 101 of the electricity customer 1-2 sends a value of 10 kWh as the wheeling capacity value for the electricity customer 1-1, and a value of 0 kWh as the wheeling capacity value for the electricity customer 1-3. The energy management system 101 of the electricity customer 1-3 sends a value of 30 kWh as the wheeling capacity value for the electricity customer 1-1, and a value of 0 kWh as the wheeling capacity value for the electricity customer 1-2.

FIG. 20 is a chart illustrating an example of wheeling plans for the respective electricity customers generated using the receive capacity values illustrated in FIG. 19 using the processing procedure illustrated in FIG. 14. Similarly to the first embodiment, each of the energy management systems 101 of the respective electricity customers generates a wheeling plan based on the wheeling capacity values received. As illustrated in FIG. 20, due to consistency of the wheeling request amount of the electricity customer 1-1 with the wheeling capacity values received from the energy management systems 101 of the electricity customer 1-2 and of the electricity customer 1-3, the energy management system 101 of the electricity customer 1-1 fixes the wheeling plan. Similarly, due to consistency of the wheeling request amount of the electricity customer 1-2 with the wheeling capacity values received from the energy management systems 101 of the electricity customer 1-1 and of the electricity customer 1-3, the energy management system 101 of the electricity customer 1-2 fixes the wheeling plan.

Meanwhile, the energy management system 101 of the electricity customer 1-3 learns that the wheeling request amount of the electricity customer 1-3 is −50 kWh, while the amounts of electricity that can be received from the electricity customer 1-1 and from the electricity customer 1-2 are respectively 20 kWh and 0 kWh. This condition causes the energy management system 101 of the electricity customer 1-3 to determine that 30 kWh of electricity will be deficient even during electricity reception from the electricity customer 1-1. Thus, at step S20 illustrated in FIG. 14, the energy management system 101 of the electricity customer 1-3 updates the corresponding wheeling request amount with a value of −30 kWh, and the process returns to step S13.

FIG. 21 is a chart illustrating an example of wheeling request amounts of the respective electricity customers after the rearrangement at step S20. FIG. 21 illustrates the wheeling request amounts of the respective electricity customers after the rearrangement at step S20 in a case in which the electricity deficiency of the electricity customer 1-3 has not been compensated for in the example illustrated in FIGS. 15 to 20. FIG. 22 is a chart illustrating an example of wheeling necessity values calculated based on the wheeling request amounts of the respective electricity customers after the rearrangement illustrated in FIG. 21. As illustrated in FIG. 21, the electricity customers other than the electricity customer 1-3 (i.e., the electricity customer 1-1 and the electricity customer 1-2) each have no wheeling request, i.e., a wheeling request amount of 0. Accordingly, upon reception of a new electricity wheeling request, the energy management systems 101 of the electricity customer 1-1 and of the electricity customer 1-2 each determine the wheeling capacity value for the electricity customer 1-3 to be 0 kWh due to the electricity wheeling requests of the electricity customer 1-1 and of the electricity customer 1-2 that are both 0.

Figures 23, 24:
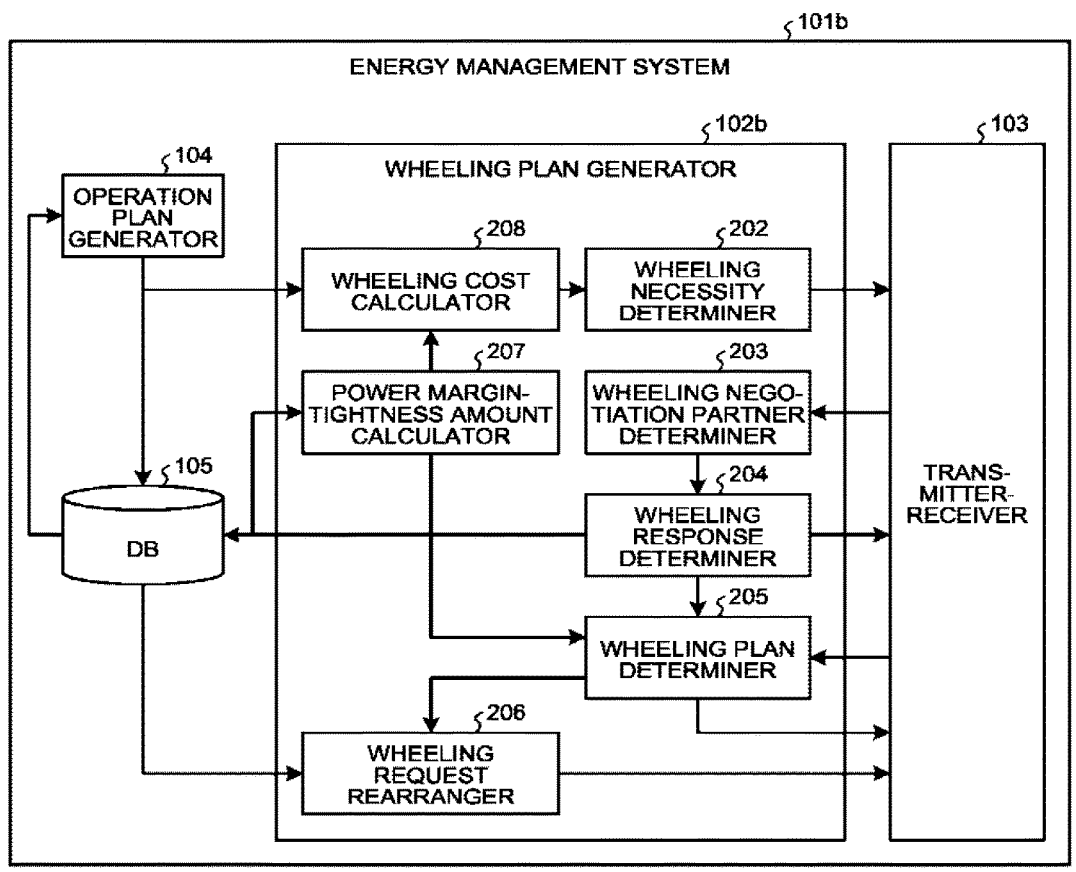
FIG. 23 is a chart illustrating an example of the finalized wheeling plans.
FIG. 24 is a diagram illustrating an example configuration of an energy management system of a third embodiment.

When an amount of 0 kWh is notified as the wheeling capacity value from all other electricity customers, the energy management system 101 of the electricity customer 1-3 determines, at step S18, that any more electricity wheeling cannot be gained, and fixes the wheeling plan of the electricity customer 1-3. Thus, the wheeling plans of all the electricity customers become fixed, thereby causing the process to be complete. FIG. 23 is a chart illustrating an example of the finalized wheeling plans in the example described above. As illustrated in FIG. 23, this example results in fixed wheeling plans identical to the wheeling plans illustrated in FIG. 21.

As described above, the energy management system of the present embodiment performs electricity wheeling also taking into consideration a power margin amount and a power tightness amount, thereby not only providing advantages of the first embodiment, but also enabling electricity wheeling to be more flexibly provided than in the first embodiment.

Third Embodiment

FIG. 24 is a diagram illustrating an example configuration of an energy management system 101b of a third embodiment according to the present invention. The same reference characters as those of the second embodiment are used to designate elements having functions similar to those of the second embodiment, and the explanation thereof will be omitted. The differences from the second embodiment will be described below.

The energy management system 101b of the third embodiment is similar to the energy management system of the second embodiment except that the energy management system 101b includes a wheeling plan generator 102b in place of the wheeling plan generator 102a. The wheeling plan generator 102b is similar to the wheeling plan generator 102a of the second embodiment except that the wheeling plan generator 102b further includes a wheeling cost calculator 208 that calculates a wheeling cost for each range of the wheeling request amount.

Figure 25:
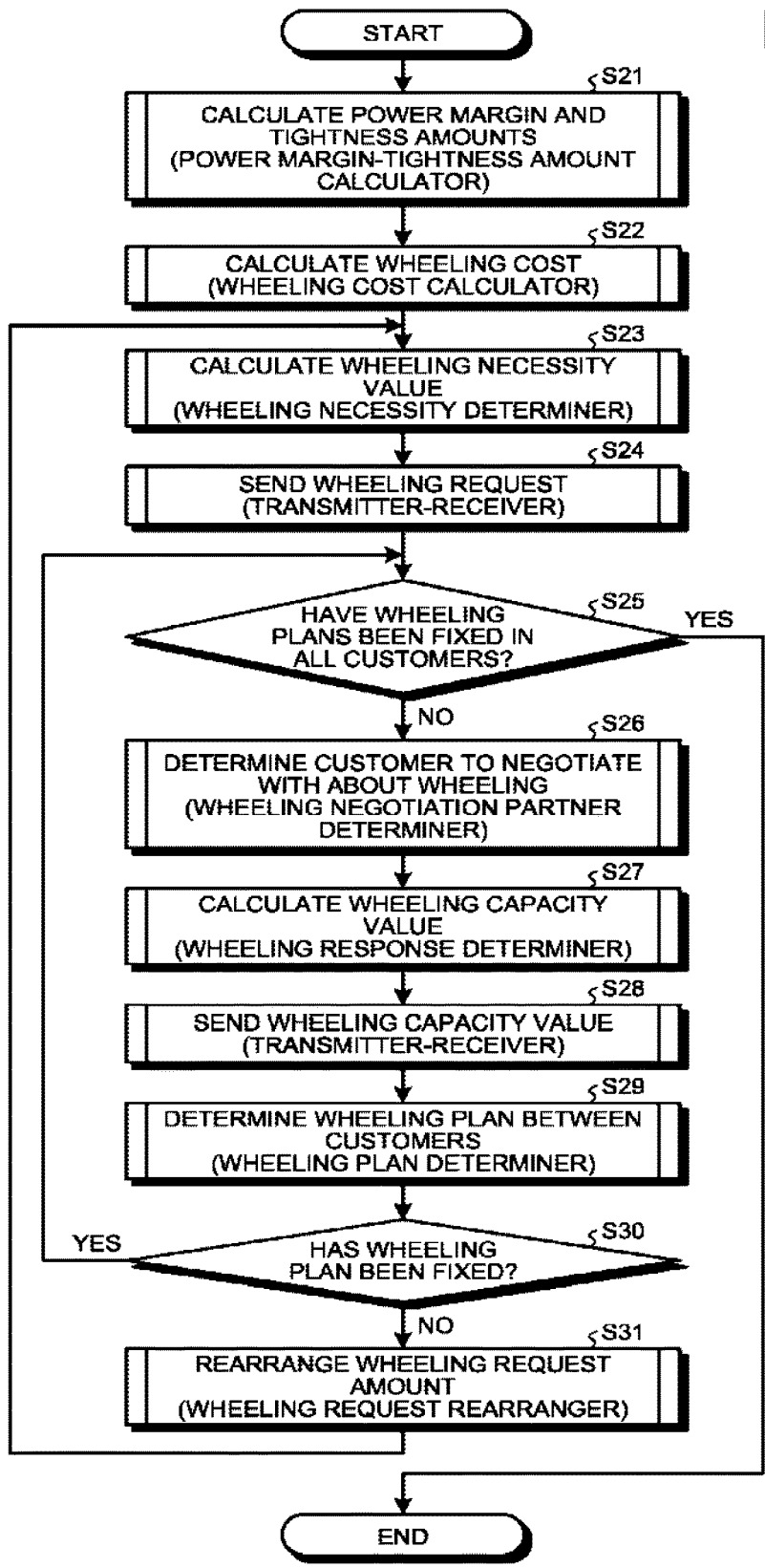
FIG. 25 is a flowchart illustrating an example of a wheeling plan generation procedure performed in a wheeling plan generator of the third embodiment.

FIG. 25 is a flowchart illustrating an example of a wheeling plan generation procedure performed in the wheeling plan generator 102b of the third embodiment. First, similarly to the second embodiment, the power margin-tightness amount calculator 207 calculates a power margin amount and a power tightness amount based on the operation plan (step S21). FIG. 26 is a chart illustrating an example of wheeling request amounts at the time t calculated by the energy management systems 101b of the respective customers at step S21. Note that, similarly to the second embodiment, the present embodiment also takes into consideration power margin and power tightness amounts in calculation of a wheeling request amount.

The wheeling cost calculator 208 determines a range or ranges of the wheeling request amount on the basis of the power margin and power tightness amounts calculated by the power margin-tightness amount calculator 207, of the operation plan, and of the power generation cost, and then calculates a wheeling cost for each range of the wheeling request amount (step S22). The wheeling cost calculator 208 outputs the wheeling cost for each range of the wheeling request amount to the transmitter-receiver 103. The wheeling cost for each range of the wheeling request amount may be calculated such that a loss cost caused by an occurrence of excess or deficiency is used as the wheeling cost, or may be calculated using a power generation cost involved in each power source. If a loss cost caused by an occurrence of excess or deficiency is used as the wheeling cost, there is no need to determine the wheeling request amount for each range, and the wheeling request amount itself can then be the power margin amount and the power tightness amount calculated by the power margin-tightness amount calculator 207 similarly to the first embodiment. The description below describes an example of calculation of wheeling cost for each range of the wheeling request amount using the power generation cost involved in each power source. That is, in the description given below, the wheeling request amount is determined in at least one range, and the wheeling cost is calculated that is involved in electricity wheeling to satisfy the wheeling request amount in each of the at least one range.

FIG. 27 is a chart illustrating an example of power supply plans and power generation costs at the time t according to the third embodiment. FIG. 27 illustrates the cost per unit amount of electricity (i.e., power generation cost) for each power source. For example, in the example illustrated in FIG. 27, the power generation cost of purchased electricity is 10 yen per kWh (hereinafter designated as "yen/kWh"); the power generation cost of solar power generation is 0 yen/kWh; and the power generation cost of power generator is 15 yen/kWh. FIG. 28 is a chart illustrating an example of power margin and power tightness amounts at the time t calculated based on the demand power amounts illustrated in FIG. 26 and on the power supply plans illustrated in FIG. 27.

FIG. 29 is a chart illustrating an example of wheeling costs for respective wheeling request amount ranges of the customers, calculated based on the power margin and power tightness amounts illustrated in FIG. 28, and on the power supply plans and the power generation costs illustrated in FIG. 27. FIGS. 28 and 27 together indicate that the electricity customer 1-1 can further purchase electricity in an amount of 30 kWh. That is, the electricity customer 1-1 has a power margin amount of 30 kWh. All of these amounts relate to purchased electricity. Thus, as illustrated in FIG. 29, the electricity customer 1-1 has a wheeling cost of 10 yen/kWh for a wheeling request amount ranging from −30 kWh to 0 kWh. As illustrated in FIG. 29, the wheeling costs are calculated for the respective types of the distributed power supply 2.

In addition, as illustrated in FIG. 28, the electricity customer 1-2 has an electricity deficiency in an amount of 10 kWh. The power generation cost for an electricity deficiency is herein assumed to be 10 yen/kWh. Moreover, as illustrated in FIG. 27, the electricity customer 1-3 can further purchase electricity in an amount of 5 kWh, and in addition, can generate 50 kWh of electricity using a power generator, meaning that the electricity customer 1-3 has a power margin amount of 55 kWh in total. Accordingly, the electricity customer 1-3 assigns a higher priority to purchased electricity that involves lower power generation cost, of purchased electricity and electricity generated by the power generator. Thus, as illustrated in FIG. 29, the electricity customer 1-3 uses the power generation cost of purchased electricity as the wheeling cost with respect to a wheeling request amount ranging from −5 to 0 kWh, and uses the power generation cost of power generator as the wheeling cost with respect to wheeling request amount ranging from −55 to −5 kWh. The energy management systems 101b of the respective customers each calculate wheeling costs for respective ranges of the wheeling request amount as exemplified in FIG. 29. Note that the term "power tightness amount" includes electricity deficiency, and the term "power margin amount" includes excess electricity. Accordingly, in a case in which excess electricity and power margin amounts both exist, at least one value range relating to that excess electricity and at least one wheeling cost (here, corresponding one(s) of the loss costs illustrated in FIG. 8) applied to the value range(s), will be additionally defined in addition to the wheeling costs for the respective value ranges illustrated in FIG. 29. Similarly, in a case in which electricity deficiency and power tightness amounts both exist, at least one value range relating to the electricity deficiency, and at least one wheeling cost applied to the value range(s), will be additionally defined in addition to the wheeling costs for the respective value ranges illustrated in FIG. 29.

Returning back to FIG. 25, after step S22, the wheeling necessity determiner 202 calculates a wheeling necessity value based on the power margin or power tightness amount and the loss cost of that customer similarly to the second embodiment (step S23). The transmitter-receiver 103 sends the wheeling request amount, the wheeling cost, and the wheeling necessity value to the energy management systems of the respective electricity customers (step S24). As exemplified in FIG. 29, the wheeling request amounts and the wheeling costs are calculated in terms of wheeling costs for respective ranges of the wheeling request amount. FIG. 30 is a chart illustrating an example of wheeling necessity values calculated using the power margin and power tightness amounts illustrated in FIG. 28 and using the loss costs illustrated in FIG. 8 related to the first embodiment.

Step S25 is performed similarly to step S14 of the second embodiment. Next, similarly to the second embodiment, the wheeling negotiation partner determiner 203 determines the electricity customer to negotiate with about wheeling, on the basis of the wheeling necessity values received from the energy management systems of the respective electricity customer (step S26).

Next, the wheeling response determiner 204 calculates a wheeling capacity value based on the wheeling request amount and the wheeling cost of the electricity customer who is a negotiation partner, received from the energy management system 101b of other electricity customer, and on the operation plan for the customer itself (step S27). The transmitter-receiver 103 then sends the wheeling capacity value to the energy management systems 102b of the respective electricity customers (step S28).

FIG. 31 is a chart illustrating the wheeling capacity values of the respective electricity customers calculated based on the operation plans of FIG. 27, and on the wheeling request amounts and the wheeling costs of FIG. 29. The energy management system 101b of the electricity customer 1-1 first determines that the electricity customer 1-2 is the first priority wheeling negotiation partner on the basis of the wheeling necessity values of the electricity customer 1-2 and of the electricity customer 1-3, and assigns an amount of 10 kWh as the amount of electricity that can be transmitted to the electricity customer 1-2, out of the wheeling request amount (i.e., maximum power margin amount) of that customer itself of 30 kWh, in view of the wheeling request amount of the electricity customer 1-2 of −10 kWh. Although the electricity customer 1-1 still has a wheeling request amount remaining, the wheeling request of the electricity customer 1-3 indicates "electricity transmission," which is the same as the wheeling request of the electricity customer 1-1, and thus the wheeling capacity to the electricity customer 1-3 is 0 kWh. As a result, the energy management system 101b of the electricity customer 1-1 sends the value of −10 kWh as the wheeling capacity value for the electricity customer 1-2, and the value of 0 kWh as the wheeling capacity value for the electricity customer 1-3.

The energy management system 101b of the electricity customer 1-2 assigns wheeling request amounts to the electricity customer 1-3 and to the electricity customer 1-1 sequentially in this order, out of the wheeling request amount of that customer itself. Upon assigning a wheeling capacity value out of the wheeling capacity value of that customer to compensate the amount of −55 kWh, which corresponds to the maximum absolute value of the wheeling request amount of the electricity customer 1-3, a consideration is given to differences in wheeling cost depending on the wheeling request amount. Electricity reception of 5 kWh or more costs 15 yen/kWh, which is higher than the loss cost of that customer. The energy management system 101*b* of the electricity customer 1-2 thus determines the wheeling capacity value so that the electricity customer 1-2 will receive 5 kWh of electricity from the electricity customer 1-3. In addition, since the electricity customer 1-2 still has a wheeling request amount remaining, the energy management system 101*b* of the electricity customer 1-2 assigns a wheeling capacity value out of the wheeling capacity value thereof to the second priority electricity customer 1-1. In view of the wheeling request amount of the electricity customer 1-1 of 30 kWh, the energy management system 101*b* of the electricity customer 1-2 assigns the remaining wheeling capacity value of the electricity customer 1-2, which is 5 kWh, as the receive capacity for the electricity customer 1-1. Accordingly, the energy management system 101*b* of the electricity customer 1-2 sends the value of 5 kWh as the wheeling capacity value for the electricity customer 1-3, and the value of 5 kWh as the wheeling capacity value for the electricity customer 1-1.

The energy management system 101*b* of the electricity customer 1-2 determines a wheeling capacity value such that if a wheeling capacity value exists, and the wheeling cost of the first priority wheeling partner is higher than the wheeling cost of the second priority wheeling partner, then the electricity customer 1-2 will transmit or receive electricity to or from the second priority wheeling partner, instead of to or from the first priority wheeling partner.

The energy management system 101*b* of the electricity customer 1-3 assigns wheeling capacity values to the electricity customer 1-2 and to the electricity customer 1-1 sequentially in this order, out of the wheeling request amount of that customer itself. First, the energy management system 101*b* of the electricity customer 1-3 assigns an amount of 10 kWh out of the wheeling request amount of that customer for the wheeling request amount of the electricity customer 1-2, which is −10 kWh, as the amount of transmittable electricity. Although the energy management system 101*b* of the electricity customer 1-3 still has a wheeling request amount remaining, the wheeling request of the electricity customer 1-1 indicates "electricity transmission," which is the same as the wheeling request of the electricity customer 1-3, and thus the wheeling capacity value to the electricity customer 1-1 is 0 kWh. As a result, the energy management system 101*b* of the electricity customer 1-3 sends the value of −10 kWh to the electricity customer 1-2, and the value of 0 kWh to the electricity customer 1-1, each as the wheeling capacity value to the corresponding electricity customer.

Returning back to FIG. 25, after step S28, the energy management system 101*b* determines a wheeling plan similar to the wheeling plan of the second embodiment (step S29). Steps S30 and S31 are respectively similar to steps S19 and S20 of the second embodiment.

FIG. 32 is a chart illustrating an example of wheeling plans determined based on the wheeling capacity values illustrated in FIG. 31. As illustrated in FIG. 32, the electricity customer 1-1 determines to transmit 5 kWh of electricity to the electricity customer 1-2. Then, due to the disagreement between the wheeling request amount and the electricity transmission amount of the electricity customer 1-1, the energy management system 101*b* of the electricity customer 1-1 rearranges the wheeling request amount to the remaining amount value of −25 kWh at step S31, and then repeats the process.

As illustrated in FIG. 32, the electricity customer 1-2 receives 5 kWh of electricity from the electricity customer 1-1 and 5 kWh of electricity from the electricity customer 1-3. Due to the agreement between the wheeling request amount and the electricity reception amount of the electricity customer 1-2, the wheeling plan of the electricity customer 1-2 is fixed. The electricity customer 1-3 receives 5 kWh of electricity from the electricity customer 1-2. Then, due to the disagreement between the wheeling request amount and the electricity transmission amount of the electricity customer 1-3, the energy management system 101*b* of the electricity customer 1-3 rearranges the wheeling request amount to the remaining amount value of −50 kWh at step S31, and then repeats the process.

FIG. 33 is a chart illustrating an example of wheeling request amounts of the respective electricity customers after the rearrangement described above. FIG. 34 is a chart illustrating wheeling necessity values of the respective electricity customers after the rearrangement described above. FIG. 35 is a chart illustrating an example of wheeling costs for the respective wheeling request amount ranges of the customers after the rearrangement described above.

As illustrated in FIG. 33, the wheeling requests of the electricity customer 1-1 and of the electricity customer 1-3 both indicate "electricity transmission," thereby resulting in no electricity wheeling performed between the electricity customer 1-1 and the electricity customer 1-3. Thus, the wheeling capacity value from the electricity customer 1-3 for the wheeling request of the electricity customer 1-1 is 0, and similarly, the wheeling capacity value from the electricity customer 1-1 for the wheeling request of the electricity customer 1-3 is also 0. Accordingly, upon reception of wheeling responses from the respective electricity customers, the energy management systems 101*b* of the electricity customer 1-1 and of the electricity customer 1-3 determine that no more electricity wheeling can be performed, and thus fix the wheeling plans.

Figures 36, 37:
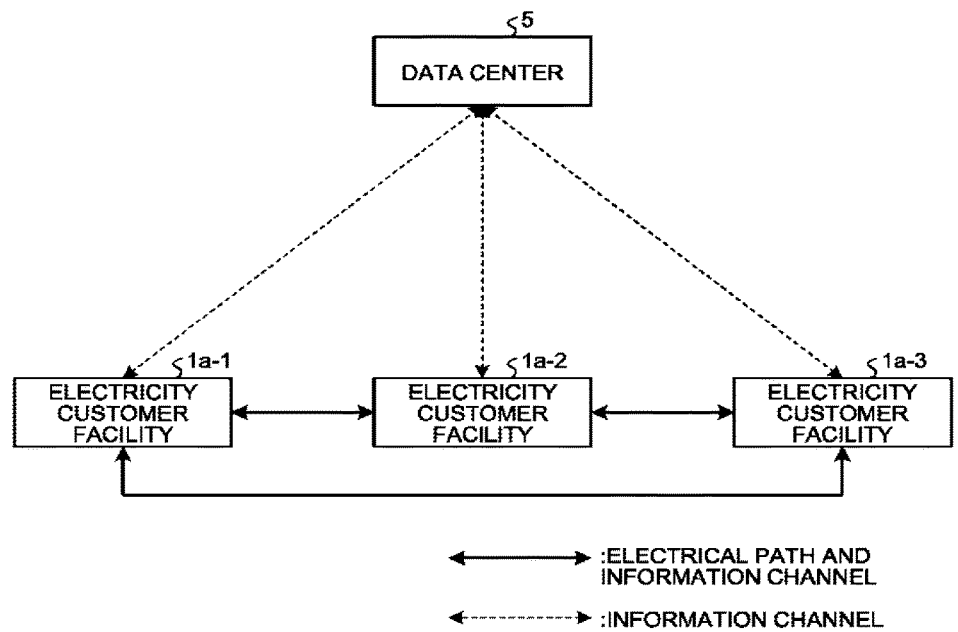
FIG. 36 is a chart illustrating an example of finalized wheeling plans after the rearrangement.
FIG. 37 is a diagram illustrating an example configuration of an electricity wheeling system of a fourth embodiment.

FIG. 36 is a chart illustrating an example of finalized wheeling plans after the rearrangement described above. As illustrated in FIG. 36, the fixed wheeling plans in this case are the same as the wheeling plans illustrated in FIG. 32.

As described above, the energy management system of the present embodiment determines a wheeling capacity value taking into consideration the power generation cost, thereby not only providing advantages similar to those of the second embodiment, but also enabling electricity wheeling to be more suitably provided than in the second embodiment.

Fourth Embodiment

Energy management systems according to a fourth embodiment will next be described. In the first, second, and third embodiments, the electricity customers exchange information such as an amount of excess electricity, an amount of electricity deficiency, and a wheeling necessity value between the electricity customers to determine, by themselves, the electricity wheeling partner and the electricity wheeling amount. However, performing electricity wheeling between electricity customers does not necessarily require an electricity customer to individually determine the electricity wheeling partner and the electricity wheeling amount, but instead, a device in a facility such as a data center may determine the electricity wheeling partners and the electricity wheeling amounts of all the electricity customers.

FIG. 37 is a diagram illustrating an example configuration of an electricity wheeling control system according to the fourth embodiment. The electricity wheeling system illustrated in FIG. 37 includes a data center 5 that aggregates information. The data center 5 determines the electricity wheeling partners and the electricity wheeling amounts of all the electricity customers. Although FIG. 37 illustrates customer facilities 1a-1 to 1a-3 that respectively correspond to the three electricity customers, the number of electricity customers for which the data center 5 determines an electricity wheeling amount is not limited to that of the example illustrated in FIG. 37.

Figure 38:
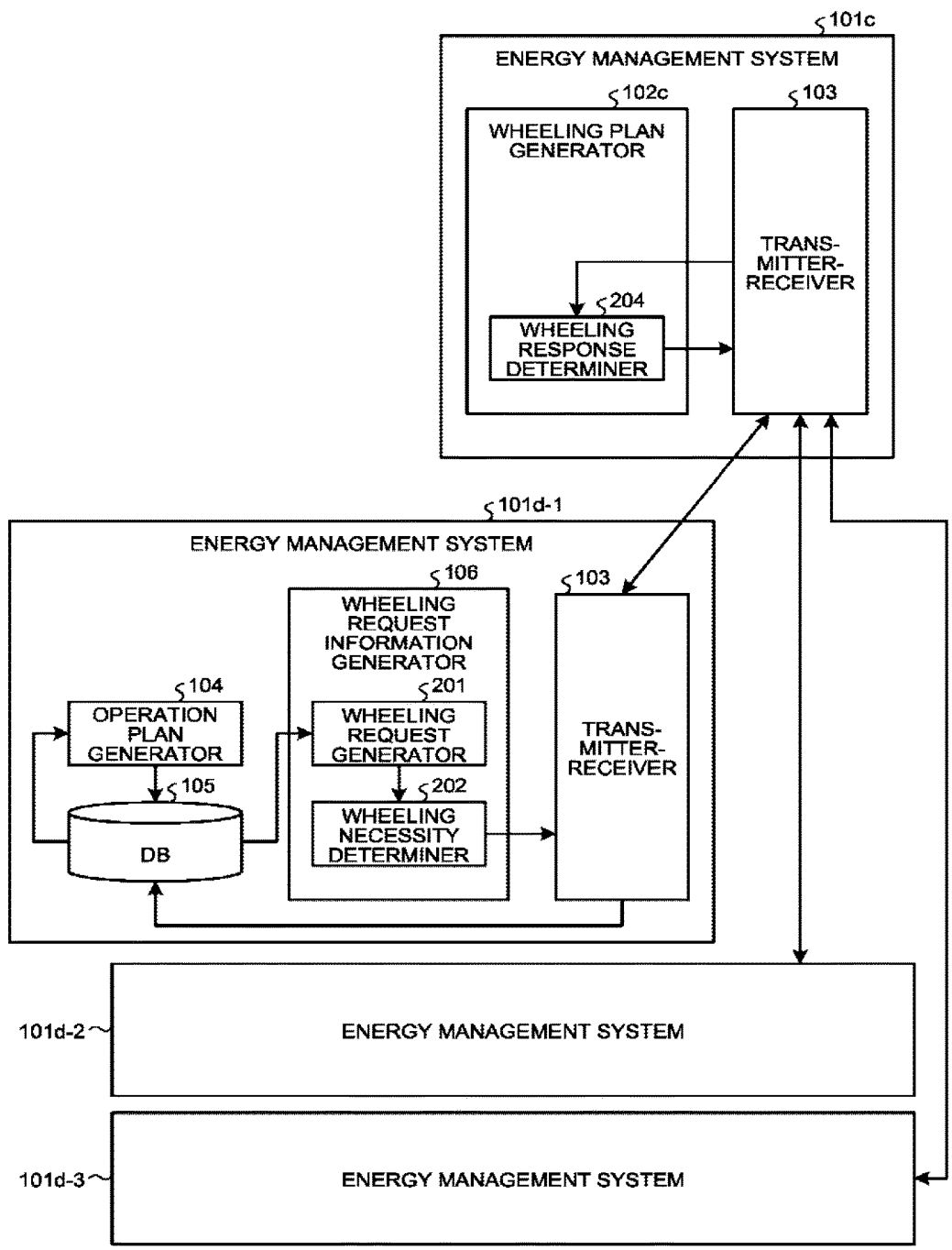
FIG. 38 is a diagram illustrating an example configuration of energy management systems of the fourth embodiment.

FIG. 38 is a diagram illustrating an example configuration of the energy management systems of fourth embodiment. The data center 5 includes therein an energy management system 101c, which is a first electricity wheeling control apparatus of the fourth embodiment. The customer facilities 1a-1 to 1a-3 respectively include therein energy management systems 101d-1 to 101d-3, which are each a second electricity wheeling control apparatus of the fourth embodiment. Although FIG. 38 illustrates the configuration of the energy management system 101d-1, the configurations of the energy management systems 101d-2 and 101-3 are similar to the configuration of the energy management system 101d-1. Similarly to the customer facility 1 of the first embodiment, the customer facilities 1a-1 to 1a-3 each include the distributed power supply 2 and the load system 4. Hereafter, a term "customer facility 1a" is used generically to refer collectively to the customer facilities 1a-1 to 1a-3, and a term "energy management system 101d" is used generically to refer collectively to the energy management systems 101d-1 to 101d-3. As described above, the electricity wheeling control system of the fourth embodiment consists of the first electricity wheeling control apparatus in the data center 5 not having a distributed power supply nor a load system, and the second electricity wheeling control apparatus in the electricity customer facility 1a having the distributed power supply and the load system. The same reference characters as those of the first embodiment are used to designate elements having functions similar to those of the first embodiment, and the explanation thereof will be omitted.

The energy management system 101c that determines the electricity wheeling amounts of the respective electricity customers will first be described. As illustrated in FIG. 38, the energy management system 101c that determines the electricity wheeling amounts of the respective electricity customers includes a wheeling plan generator 102c and the transmitter-receiver 103. The wheeling plan generator 102c includes the wheeling response determiner 204.

The wheeling response determiner 204 calculates the electricity wheeling partners and the electricity wheeling amounts of the respective electricity customers on the basis of the wheeling request amounts and the wheeling necessity values of the respective electricity customers received from the transmitter-receiver 103. The wheeling response determiner 204 then sends the electricity wheeling partners and the electricity wheeling amounts calculated to the respective energy management systems 101d of the respective electricity customers via the transmitter-receiver 103. The wheeling response determiner 204 calculates the electricity wheeling partners and the electricity wheeling amounts of the respective electricity customers similarly to the first embodiment.

The energy management system 101d of each of the electricity customers will next be described. The energy management system 101d of each of the electricity customers includes the operation plan generator 104, the database storage 105, the wheeling request information generator 106, and the transmitter-receiver 103. The wheeling request information generator 106 includes the wheeling request generator 201 and the wheeling necessity determiner 202.

Similarly to the first embodiment, the wheeling request generator 201 determines whether there is excess electricity or electricity deficiency based on the operation plan stored in the database storage 105 to generate a wheeling request.

The wheeling necessity determiner 202 calculates a wheeling necessity value based on the wheeling request amount. The wheeling necessity value is calculated in the same manner as in the first embodiment.

The transmitter-receiver 103 of the energy management system 101d sends the wheeling request amount and the wheeling necessity value to the energy management system 101c. In addition, the transmitter-receiver 103 of the energy management system 101d receives an electricity wheeling partner and an electricity wheeling amount from the energy management system 101c, and stores the electricity wheeling partner and the electricity wheeling amount received, in the database storage 105.

Although the present embodiment has been described in terms of a configuration in which the wheeling request information generator 106 includes the wheeling request generator 201 and the wheeling necessity determiner 202, the wheeling request information generator 106 may include the power margin-tightness amount calculator 207 of the second embodiment in place of the wheeling request generator 201, or may otherwise include the power margin-tightness amount calculator 207 and the wheeling cost calculator 208 of the third embodiment in place of the wheeling request generator 201.

As described above, the present embodiment eliminates the need for each electricity customer to individually determine the electricity wheeling partner and the electricity wheeling amount, thereby enabling a reduction in the load of the energy management system included in each electricity customer.

Fifth Embodiment

Energy management systems according to a fifth embodiment will next be described. In the fourth embodiment, instead of each of the electricity customers individually determining the electricity wheeling partner and the electricity wheeling amount, the energy management system 101c that aggregates information of the electricity customers determines the electricity wheeling partners and the electricity wheeling amounts of all the electricity customers. However, the configuration of the fourth embodiment requires the data center 5 in addition to the electricity customers. In the fifth embodiment, the energy management systems of the respective electricity customers are each defined as a master unit or a slave unit to perform electricity wheeling between the electricity customers.

Figure 39:
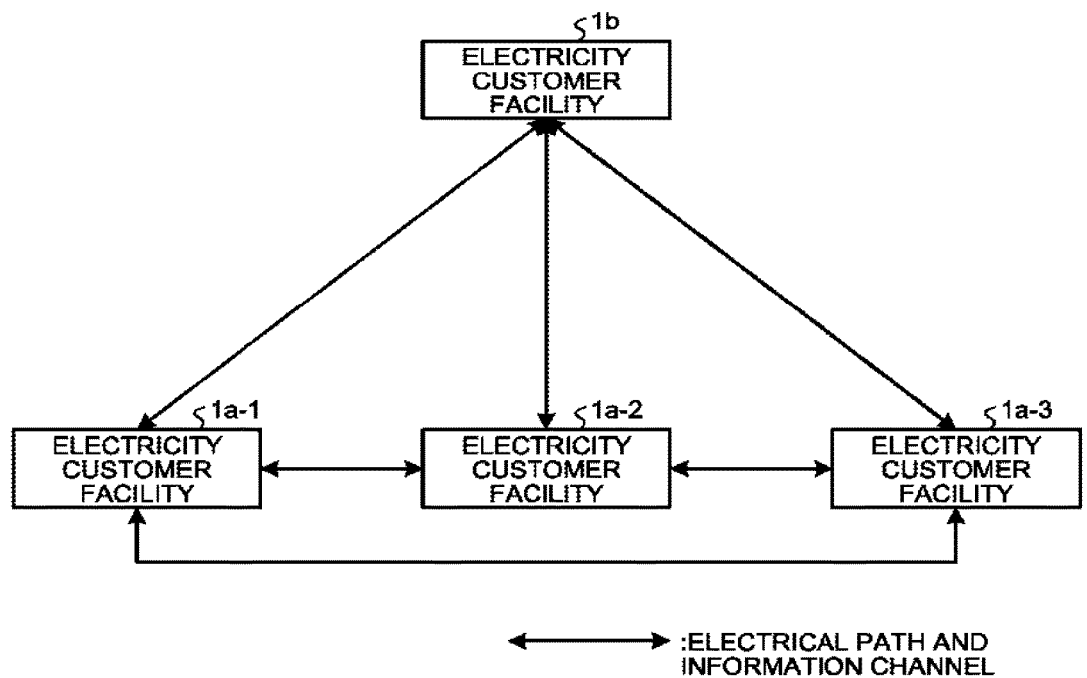
FIG. 39 is a diagram illustrating an example configuration of an electricity wheeling system of a fifth embodiment.

FIG. 39 is a diagram illustrating an example configuration of an electricity wheeling control system according to the fifth embodiment. The electricity wheeling system illustrated in FIG. 39 includes a customer facility 1b and the customer facilities 1a-1 to 1a-3. The customer facility 1b includes an energy management system that operates as a master unit. The customer facilities 1a-1 to 1a-3 each include an energy management system that operates as a slave unit. Although FIG. 39 illustrates the three customer facilities 1a-1 to 1a-3, the number of customer facilities 1a that can be connected to the customer facility 1b is not limited to that of the example illustrated in FIG. 39.

Figure 40:
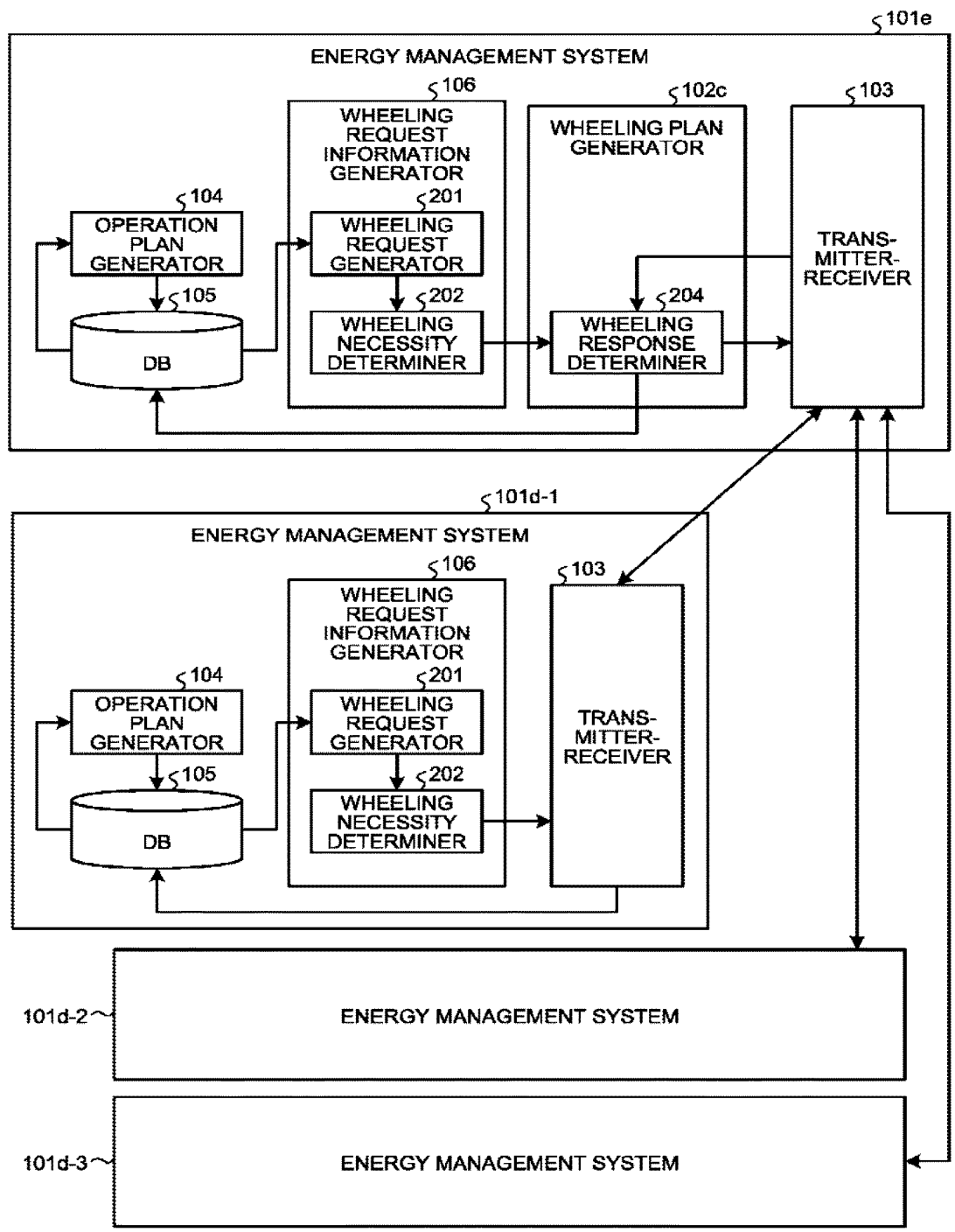
FIG. 40 is a diagram illustrating an example configuration of energy management systems of the fifth embodiment.

FIG. 40 is a diagram illustrating an example configuration of energy management systems of the fifth embodiment. An energy management system 101e, which is a first electricity wheeling control apparatus of the fifth embodiment, operates as a master unit that generates electricity wheeling request information of that customer itself, and aggregates electricity wheeling request information of the electricity customers including that customer itself, thus to determine electricity wheeling of the electricity customers. The energy management system 101d, which is a second electricity wheeling control apparatus of the fifth embodiment, operates as a slave unit that generates electricity wheeling request information of that customer itself similarly to the fourth embodiment. The same reference characters as those of the first or fourth embodiment are used to designate elements having functions similar to those of the first or fourth embodiment, and the explanation thereof will be omitted.

The energy management system 101e serving as the master unit includes the operation plan generator 104, the database storage 105, the wheeling request information generator 106, the wheeling plan generator 102c, and the transmitter-receiver 103. The wheeling request information generator 106 includes the wheeling request generator 201 and the wheeling necessity determiner 202. The wheeling plan generator 102c includes the wheeling response determiner 204.

Similarly to the fourth embodiment, the energy management system 101d serving as a slave unit includes the operation plan generator 104, the database storage 105, the wheeling request information generator 106, and the transmitter-receiver 103. The wheeling request information generator 106 includes the wheeling request generator 201 and the wheeling necessity determiner 202.

Similarly to the first and fourth embodiments, the wheeling request generators 201 of the energy management system 101e and of the energy management system 101d each determine whether there is excess electricity or electricity deficiency based on the operation plan stored in the database storage 105 to generate a wheeling request.

Similarly to the first and fourth embodiments, the wheeling necessity determiners 202 of the energy management system 101e and of the energy management system 101d each calculate a wheeling necessity value based on the wheeling request amount.

The transmitter-receiver 103 of the energy management system 101d sends the wheeling request amount and the wheeling necessity value to the energy management system 101e.

The wheeling response determiner 204 of the energy management system 101e calculates electricity wheeling partners and electricity wheeling amounts of the respective electricity customers on the basis of wheeling request amounts and wheeling necessity values received from the energy management systems 101d of the respective electricity customers through the transmitter-receiver 103, and on the basis of the wheeling request amount and the wheeling necessity value calculated by the energy management system 101e. The wheeling response determiner 204 calculates the electricity wheeling partner and the electricity wheeling amount of each of the electricity customers similarly to the first embodiment.

The transmitter-receiver 103 of the energy management system 101e sends the electricity wheeling partners and the electricity wheeling amounts to the energy management systems 101d of the respective electricity customers. In addition, the transmitter-receiver 103 of each of the energy management systems 101d stores the electricity wheeling partner and the electricity wheeling amount for that customer received from the energy management system 101e, in the database storage 105.

Although the example described above assumes that the customer facilities each include either the energy management system 101e or the energy management system 100d, the customer facilities may have energy management systems each having a common configuration. That is, the customer facilities 1a in FIG. 39 may each include the energy management system 101e. In this case, the energy management system 101e that operates as the master management unit, that is, the electricity customer that aggregates the information, is previously defined. The energy management system 101e determined to operate as the master management unit operates similarly to the energy management system 101e other than the master management unit of the electricity customer facility 1b described above, while the energy management systems 101e operate similarly to the energy management systems 101d of the customer facilities 1a described above. The electricity customer that aggregates the information may be defined at random each time, or may be changed sequentially in a predetermined order. The electricity customer that aggregates the information may be changed to another electricity customer each time an operation plan is generated, every day, every month, or every year.

Although the present embodiment has been described in terms of a configuration in which the wheeling request information generator 106 includes the wheeling request generator 201 and the wheeling necessity determiner 202, the wheeling request information generator 106 may include the power margin-tightness amount calculator 207 of the second embodiment in place of the wheeling request generator 201, or may otherwise include the power margin-tightness amount calculator 207 and the wheeling cost calculator 208 of the third embodiment in place of the wheeling request generator 201.

As described above, the configuration of the present embodiment divides the electricity customers into the electricity customer that aggregates the information and the other electricity customers, thereby enables electricity wheeling amounts of the respective electricity customers to be determined without further providing a data center for aggregating information and determining electricity wheeling partners and electricity wheeling amounts.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 101, 101a, 101b, 101c, 101d, 101e energy management system; 102, 102a, 102b, 102c wheeling plan generator; 103 transmitter-receiver; 104 operation plan generator; 106 wheeling request information generator; 201 wheeling request generator; 202 wheeling necessity determiner; 203 wheeling negotiation partner determiner; 204 wheeling response determiner; 205 wheeling plan determiner; 206 wheeling request rearranger; 207 power margin-tightness amount calculator; 208 wheeling cost calculator.

The invention claimed is:

1. An electricity wheeling control apparatus in an electricity customer possessing a distributed power supply and a load system, the electricity wheeling control apparatus comprising:
    a wheeling request generator to generate a wheeling request including a wheeling request amount that represents an amount of wheeling electricity to be requested, on the basis of an operation plan for the distributed power supply and on the basis of an electricity purchase plan;
    a wheeling necessity determiner to calculate a wheeling necessity value on the basis of the wheeling request amount;
    a transmitter-receiver to send the wheeling request amount and the wheeling necessity value to an electricity wheeling control apparatus of another electricity customer;
    a negotiation partner determiner to determine at least one negotiation partner, who is an electricity customer to negotiate with about wheeling, on the basis of wheeling necessity values received from electricity wheeling control apparatuses of a group of other electricity customers;
    a wheeling response determiner to calculate, for each of the at least one negotiation partner, a wheeling capacity value that represents an amount of electricity that can be allocated to the at least one negotiation partner, on the basis of wheeling request amounts received from the electricity wheeling control apparatuses of the group of other electricity customers and on the basis of the operation plan, and to send the wheeling capacity value to an electricity wheeling control apparatus of the at least one negotiation partner, via the transmitter-receiver; and
    a wheeling plan determiner to determine a wheeling plan on the basis of wheeling capacity values received from the electricity wheeling control apparatuses of the group of other electricity customers and on the basis of the wheeling request amount calculated by the wheeling request generator.

2. The electricity wheeling control apparatus according to claim 1, wherein the wheeling necessity determiner uses a loss cost due to an excess or deficiency of electricity, as the wheeling necessity value.

3. The electricity wheeling control apparatus according to claim 1, wherein the wheeling necessity determiner uses, as the wheeling necessity value, a product of an absolute value of the wheeling request amount multiplied by a loss cost due to an excess or deficiency of electricity.

4. The electricity wheeling control apparatus according to claim 1,
    wherein the negotiation partner determiner prioritizes the at least one negotiation partner such that higher priority is given to one, of the at least one negotiation partner, having a higher wheeling necessity value among the wheeling necessity values received from the electricity wheeling control apparatuses of the group of other electricity customers, and
    the wheeling response determiner assigns the wheeling request amount calculated by the wheeling request generator to the at least one negotiation partner sequentially in order of priority.

5. The electricity wheeling control apparatus according to claim 1, wherein the wheeling request amount includes at least one of:
    a value calculated by subtracting an amount of demand power (hereinafter referred to as "demand power amount") from an amount of supply power (hereinafter referred to as "supply power amount") calculated based on the operation plan for the distributed power supply and based on the electricity purchase plan,
    a power margin amount calculated based on the operation plan for the distributed power supply and on the electricity purchase plan, and on a maximum amount of electricity that can be supplied, calculated based on device information defined for each power source; or
    a power tightness amount calculated based on a cost per unit amount of electricity per power source.

6. The electricity wheeling control apparatus according to claim 5, further comprising:
    a wheeling cost calculator to calculate, in relation to the wheeling request amount determined in one or more value ranges, a wheeling cost required to perform electricity wheeling in a wheeling request amount corresponding to each of the one or more value ranges,
    wherein the transmitter-receiver sends the wheeling cost, together with the wheeling request amount, to electricity wheeling control apparatuses of the group of other electricity customers, and
    the wheeling plan determiner determines a wheeling plan on the basis of the wheeling request amount and the wheeling cost.

7. The electricity wheeling control apparatus according to claim 6, wherein the wheeling cost is a loss cost due to an excess or deficiency of electricity.

8. The electricity wheeling control apparatus according to claim 6, wherein the wheeling cost is calculated for each type of the distributed power supply.

9. The electricity wheeling control apparatus according to claim 5, wherein the wheeling necessity determiner uses an absolute value of the wheeling request amount as the wheeling necessity value if the wheeling request amount is the power margin amount or the power tightness amount, and uses, as the wheeling necessity value, a product of the absolute value of the wheeling request amount multiplied by a loss cost due to an excess or deficiency of electricity if the wheeling request amount is a value calculated by subtracting the demand power amount from the supply power amount.

10. An electricity wheeling control method in an electricity wheeling control apparatus in an electricity customer possessing a distributed power supply and a load system, the electricity wheeling control method comprising:
    generating, by the electricity wheeling control apparatus, a wheeling request including a wheeling request amount that represents an amount of wheeling electricity to be requested, on the basis of an operation plan for the distributed power supply and on the basis of an electricity purchase plan;
    calculating, by the electricity wheeling control apparatus, a wheeling necessity value on the basis of the wheeling request amount;
    sending, by the electricity wheeling control apparatus, the wheeling request amount and the wheeling necessity value to an electricity wheeling control apparatus of another electricity customer;
    determining, by the electricity wheeling control apparatus, at least one negotiation partner, who is an electricity customer to negotiate with about wheeling, on the basis of wheeling necessity values received from electricity wheeling control apparatuses of a group of other electricity customers;

calculating, by the electricity wheeling control apparatus, for each of the at least one negotiation partner, a wheeling capacity value that represents an amount of electricity that can be allocated to the at least one negotiation partner, on the basis of wheeling request amounts received from the electricity wheeling control apparatuses of the group of other electricity customers and on the basis of the operation plan, and of sending the wheeling capacity value to an electricity wheeling control apparatus of the at least one negotiation partner; and determining, by the electricity wheeling control apparatus, a wheeling plan on the basis of wheeling capacity values received from the electricity wheeling control apparatuses of the group of other electricity customers and on the basis of the calculated wheeling request amount.

11. An electricity wheeling control system comprising:
a first electricity wheeling control apparatus in a data center not possessing a distributed power supply nor a load system; and
a second electricity wheeling control apparatus in each of electricity customers each possessing a distributed power supply and a load system,
wherein the second electricity wheeling control apparatus includes
a wheeling request generator to generate a wheeling request including a wheeling request amount that represents an amount of wheeling electricity to be requested, on the basis of an operation plan for the distributed power supply and on the basis of an electricity purchase plan,
a wheeling necessity determiner to calculate a wheeling necessity value on the basis of the wheeling request amount, and
a transmitter-receiver to send the wheeling request amount and the wheeling necessity value to the first electricity wheeling control apparatus, and to receive a wheeling partner and a wheeling amount determined by the first electricity wheeling control apparatus, from the first electricity wheeling control apparatus, and
the first electricity wheeling control apparatus includes
a wheeling plan generator to determine a wheeling partner and a wheeling amount of each of the electricity customers on the basis of the wheeling request amount and the wheeling necessity value received from the second electricity wheeling control apparatus, and
a transmitter-receiver to receive the wheeling request amount and the wheeling necessity value from the second electricity wheeling control apparatus in each of the electricity customers, and to send the wheeling partner and the wheeling amount determined to the second electricity wheeling control apparatus in each of the electricity customers.

12. An electricity wheeling control system comprising:
a plurality of electricity wheeling control apparatuses each corresponding to a plurality of electricity customers each possessing a distributed power supply and a load system,
wherein each of the plurality of electricity wheeling control apparatuses includes
a wheeling request generator to generate a wheeling request including a wheeling request amount that represents an amount of wheeling electricity to be requested, on the basis of an operation plan for the distributed power supply and on the basis of an electricity purchase plan, and
a wheeling necessity determiner to calculate a wheeling necessity value on the basis of the wheeling request amount,
at least one of the plurality of electricity wheeling control apparatuses is a first electricity wheeling control apparatus that determines a wheeling partner and a wheeling amount of each of the electricity customers, and the plurality of electricity wheeling control apparatuses other than the first electricity wheeling control apparatus are each a second electricity wheeling control apparatus,
the second electricity wheeling control apparatus includes
a transmitter-receiver to send the wheeling request amount and the wheeling necessity value of the second electricity wheeling control apparatus to the first electricity wheeling control apparatus, and to receive the wheeling partner and the wheeling amount determined by the first electricity wheeling control apparatus from the first electricity wheeling control apparatus, and
the first electricity wheeling control apparatus includes
a wheeling plan generator to determine the wheeling partner and the wheeling amount of each of the electricity customers on the basis of the wheeling request amount and the wheeling necessity value received from the second electricity wheeling control apparatus and on the basis of the wheeling request amount and the wheeling necessity value of the first electricity wheeling control apparatus, and
a transmitter-receiver to receive the wheeling request amount and the wheeling necessity value from the second electricity wheeling control apparatus in each of the electricity customers, and to send the wheeling partner and the wheeling amount determined to the second electricity wheeling control apparatus in each of the electricity customers.

13. The electricity wheeling control apparatus according to claim 2,
wherein the negotiation partner determiner prioritizes the at least one negotiation partner such that higher priority is given to one, of the at least one negotiation partner, having a higher wheeling necessity value among the wheeling necessity values received from the electricity wheeling control apparatuses of the group of other electricity customers, and
the wheeling response determiner assigns the wheeling request amount calculated by the wheeling request generator to the at least one negotiation partner sequentially in order of priority.

14. The electricity wheeling control apparatus according to claim 3,
wherein the negotiation partner determiner prioritizes the at least one negotiation partner such that higher priority is given to one, of the at least one negotiation partner, having a higher wheeling necessity value among the wheeling necessity values received from the electricity wheeling control apparatuses of the group of other electricity customers, and
the wheeling response determiner assigns the wheeling request amount calculated by the wheeling request generator to the at least one negotiation partner sequentially in order of priority.

15. The electricity wheeling control apparatus according to claim 6, wherein the wheeling necessity determiner uses an absolute value of the wheeling request amount as the wheeling necessity value if the wheeling request amount is the power margin amount or the power tightness amount, and uses, as the wheeling necessity value, a product of the absolute value of the wheeling request amount multiplied by a loss cost due to an excess or deficiency of electricity if the wheeling request amount is a value calculated by subtracting the demand power amount from the supply power amount.

16. The electricity wheeling control apparatus according to claim 7, wherein the wheeling necessity determiner uses an absolute value of the wheeling request amount as the wheeling necessity value if the wheeling request amount is the power margin amount or the power tightness amount, and uses, as the wheeling necessity value, a product of the absolute value of the wheeling request amount multiplied by a loss cost due to an excess or deficiency of electricity if the wheeling request amount is a value calculated by subtracting the demand power amount from the supply power amount.

17. The electricity wheeling control apparatus according to claim 8, wherein the wheeling necessity determiner uses an absolute value of the wheeling request amount as the wheeling necessity value if the wheeling request amount is the power margin amount or the power tightness amount, and uses, as the wheeling necessity value, a product of the absolute value of the wheeling request amount multiplied by a loss cost due to an excess or deficiency of electricity if the wheeling request amount is a value calculated by subtracting the demand power amount from the supply power amount.

\* \* \* \* \*